United States Patent
Hasegawa et al.

(10) Patent No.: US 11,010,104 B2
(45) Date of Patent: May 18, 2021

(54) OPTIMIZED TAPE DRIVE UNMOUNTING

(71) Applicant: International Business Machines Corporation, Armonk, NY (US)

(72) Inventors: Tohru Hasegawa, Tokyo (JP); Hiroshi Itagaki, Yokohama (JP); Tsuyoshi Miyamura, Yokohama (JP); Shinsuke Mitsuma, Machida (JP); Noriko Yamamoto, Tokyo (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 16/560,092

(22) Filed: Sep. 4, 2019

(65) Prior Publication Data
US 2021/0064298 A1  Mar. 4, 2021

(51) Int. Cl.
*G06F 12/00* (2006.01)
*G06F 3/06* (2006.01)

(52) U.S. Cl.
CPC .......... *G06F 3/0686* (2013.01); *G06F 3/0647* (2013.01); *G06F 3/0659* (2013.01); *G06F 3/0685* (2013.01)

(58) Field of Classification Search
CPC .... G06F 3/0686; G06F 3/0647; G06F 3/0659; G06F 3/0685
See application file for complete search history.

(56) References Cited

U.S. PATENT DOCUMENTS

| | | | |
|---|---|---|---|
| 9,244,628 B2 | 1/2016 | Butt | |
| 9,600,493 B1 * | 3/2017 | Hasegawa | G06F 3/067 |
| 9,747,056 B1 * | 8/2017 | Kawamura | G06F 3/0643 |
| 9,952,770 B2 | 4/2018 | Hasegawa | |
| 9,996,288 B2 | 6/2018 | Iwasaki | |
| 2008/0155311 A1 * | 6/2008 | Oishi | G11B 20/1202 714/6.12 |
| 2012/0323934 A1 * | 12/2012 | Amir | G06F 16/13 707/752 |
| 2014/0063642 A1 * | 3/2014 | Argumedo | G11B 15/48 360/72.3 |
| 2014/0379980 A1 * | 12/2014 | Hasegawa | G06F 3/0623 711/111 |
| 2015/0062733 A1 * | 3/2015 | Ashida | G06F 3/0611 360/39 |
| 2016/0139824 A1 * | 5/2016 | Hasegawa | G06F 3/0605 711/112 |
| 2018/0089031 A1 | 3/2018 | Mitkar | |
| 2019/0361606 A1 * | 11/2019 | Goker | G11B 27/032 |

FOREIGN PATENT DOCUMENTS

JP  2016099728 A  5/2016

* cited by examiner

*Primary Examiner* — Prasith Thammavong
(74) *Attorney, Agent, or Firm* — Aaron N. Pontikos

(57) ABSTRACT

A computer-implemented method for faster unmount of tape drives includes generating a batch file to be migrated from a primary storage to a tape media acting as a secondary storage. The size of the batch file is determined based on an amount of available storage space on the tape media between a position in a longitudinal direction of storage (LPOS) and longitudinal position three (LP3) on the tape media. The computer-implemented method further includes migrating the batch file from the primary storage to the tape media mounted on a tape drive. Upon completion of migrating the batch file, the LPOS is within a predetermined threshold distance of LP3 on the tape media.

20 Claims, 15 Drawing Sheets

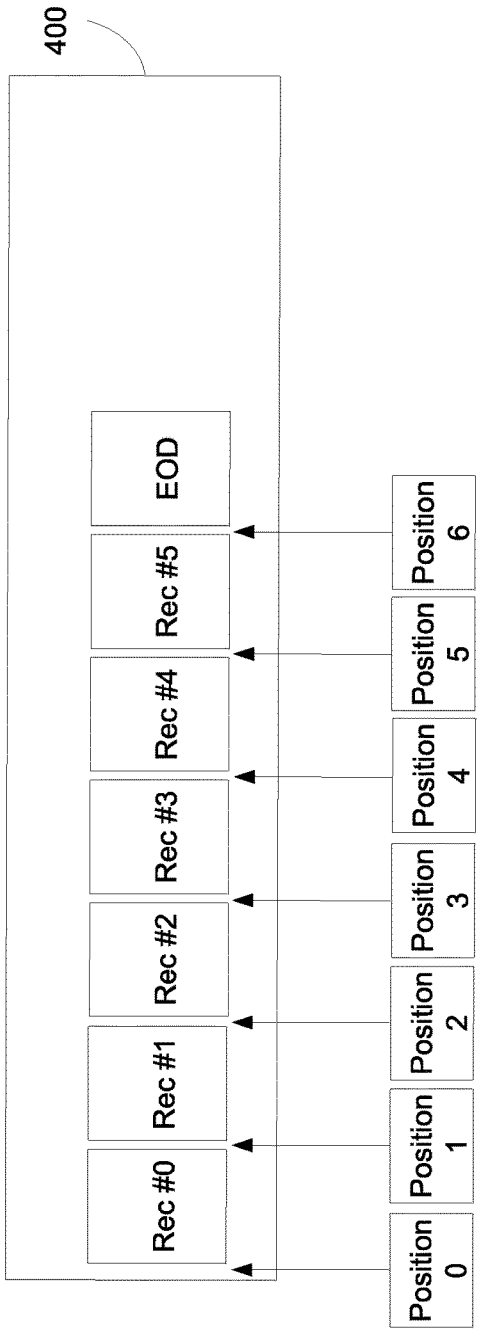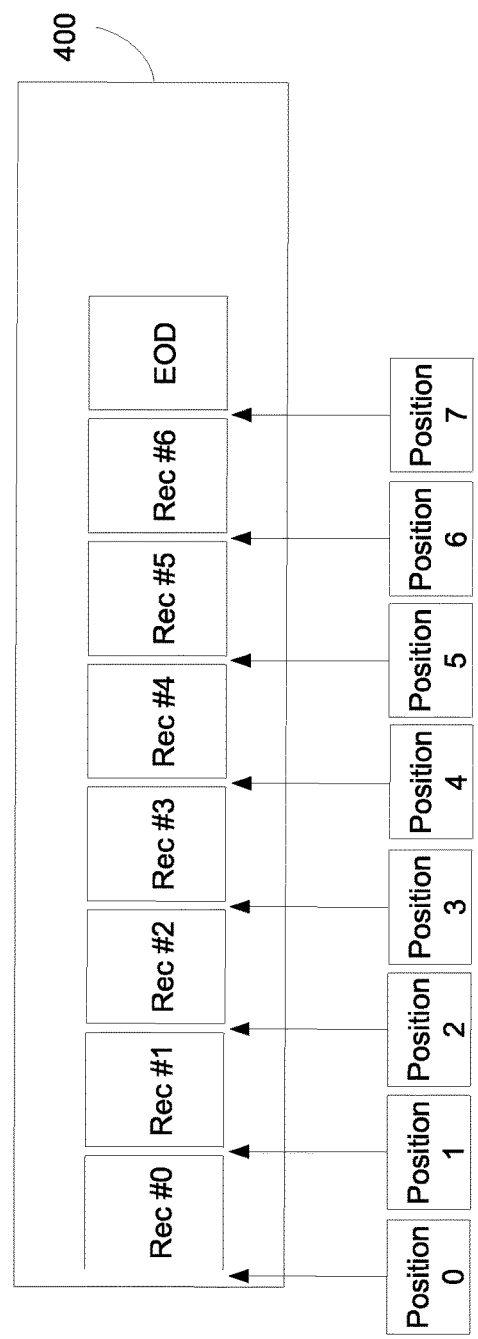

```
<file>
<name>1602970955472708845-1586314718732091392o-1220527651-39687-0</name>
<length>185504</length>
<readonly>false</readonly>
<creationtime>2013-12-17T06:45:19.429887274Z</creationtime>
<changetime>2013-12-17T06:52:02.309109393Z</changetime>
<modifytime>2013-12-17T06:52:02.246644691Z</modifytime>
<accesstime>2013-12-17T06:45:19.429887274Z</accesstime>
<backuptime>2013-12-17T06:45:19.429887274Z</backuptime>
<fileuid>7</fileuid>
<extendedattributes>
<xattr>
<key>AAA.ltfs.bbb.path</key>
<value>/AAA/bbb7/ccc.eee</value>
</xattr>
</extendedattributes>
<extentinfo>
<extent>
<fileoffset>0</fileoffset>
<partition>b</partition>
<startblock>39</startblock>
<byteoffset>0</byteoffset>
<bytecount>185504</bytecount>
<startwrap>5</startwrap>
<startlpos>295332</startlpos>
<endwrap>5</endwrap>
<endlpos>393734</endlpos>
</extent>
</extentinfo>
</file>
```

OPTIMIZED TAPE DRIVE UNMOUNTING

BACKGROUND

The present invention relates generally to the field of hierarchical storage management, and more particularly to migrating data within a hierarchical storage environment.

Hierarchical storage management is a data storage process that moves data within a tiered storage environment. In a tiered storage environment, at least two types of data storage media are delineated by differences in attributes, such as price, performance, capacity, and function. Accordingly, whether data is stored in one tier or another is defined by the requirements of the data to be stored. Typically, data files stored on high-speed storage media are migrated to slower speed storage media if the data files are not used for a period of time.

SUMMARY

According to one embodiment of the present invention, a computer-implemented method for faster unmount of tape drives is disclosed. The computer-implemented method includes generating, by one or more processors, a batch file to be migrated from a primary storage to a tape media acting as a secondary storage, wherein a size of the batch file is determined based on an amount of available storage space on the tape media between a position in a longitudinal direction of storage (LPOS) and longitudinal position three (LP3) on the tape media. The computer-implemented method further includes migrating, by the one or more processors, the batch file from the primary storage to the tape media mounted on a tape drive, wherein upon completion of migrating the batch file, the LPOS is within a predetermined threshold distance of LP3 on the tape media.

According to another embodiment of the present invention, a computer program product for faster unmount of tape drives is disclosed. The computer program product includes one or more computer readable storage media and program instructions stored on the one or more computer readable storage media. The program instructions include instructions to generate a batch file to be migrated from a primary storage to a tape media acting as a secondary storage, wherein a size of the batch file is determined based on an amount of available storage space on the tape media between a position in a longitudinal direction of storage (LPOS) and longitudinal position three (LP3) on the tape media. The program instructions further include instructions to migrate the batch file from the primary storage to the tape media mounted on a tape drive, wherein upon completion of migrating the batch file, the LPOS is within a predetermined threshold distance of LP3 on the tape media.

According to another embodiment of the present invention, a computer system faster unmount of tape drives is disclosed. The computer system includes one or more computer system includes one or more computer processors, one or more computer readable storage media, and program instructions stored on the computer readable storage media for execution by at least one of the one or more processors. The program instructions include instructions to generate a batch file to be migrated from a primary storage to a tape media acting as a secondary storage, wherein a size of the batch file is determined based on an amount of available storage space on a tape media between a position in a longitudinal direction of storage (LPOS) and longitudinal position three (LP3) on the tape media. The program instructions further include instructions to migrate the batch file from the primary storage to the tape media mounted on a tape drive, wherein upon completion of migrating the batch file, the LPOS is within a predetermined threshold distance of LP3 on the tape media.

BRIEF DESCRIPTION OF THE DRAWINGS

FIG. 4A is a block diagram illustrating an example of data stored on a data partition of a tape media, generally designated 400, in accordance with at least one embodiment of the present invention.

FIG. 4B is a block diagram illustrating an example of data stored on a data partition of a tape media, generally designated 400, in accordance with at least one embodiment of the present invention.

FIG. 7 is an exemplary index, generally designated 700, including Wrap and LPOS information obtained in accordance with at least one embodiment of the present invention.

DETAILED DESCRIPTION

Figure 1:
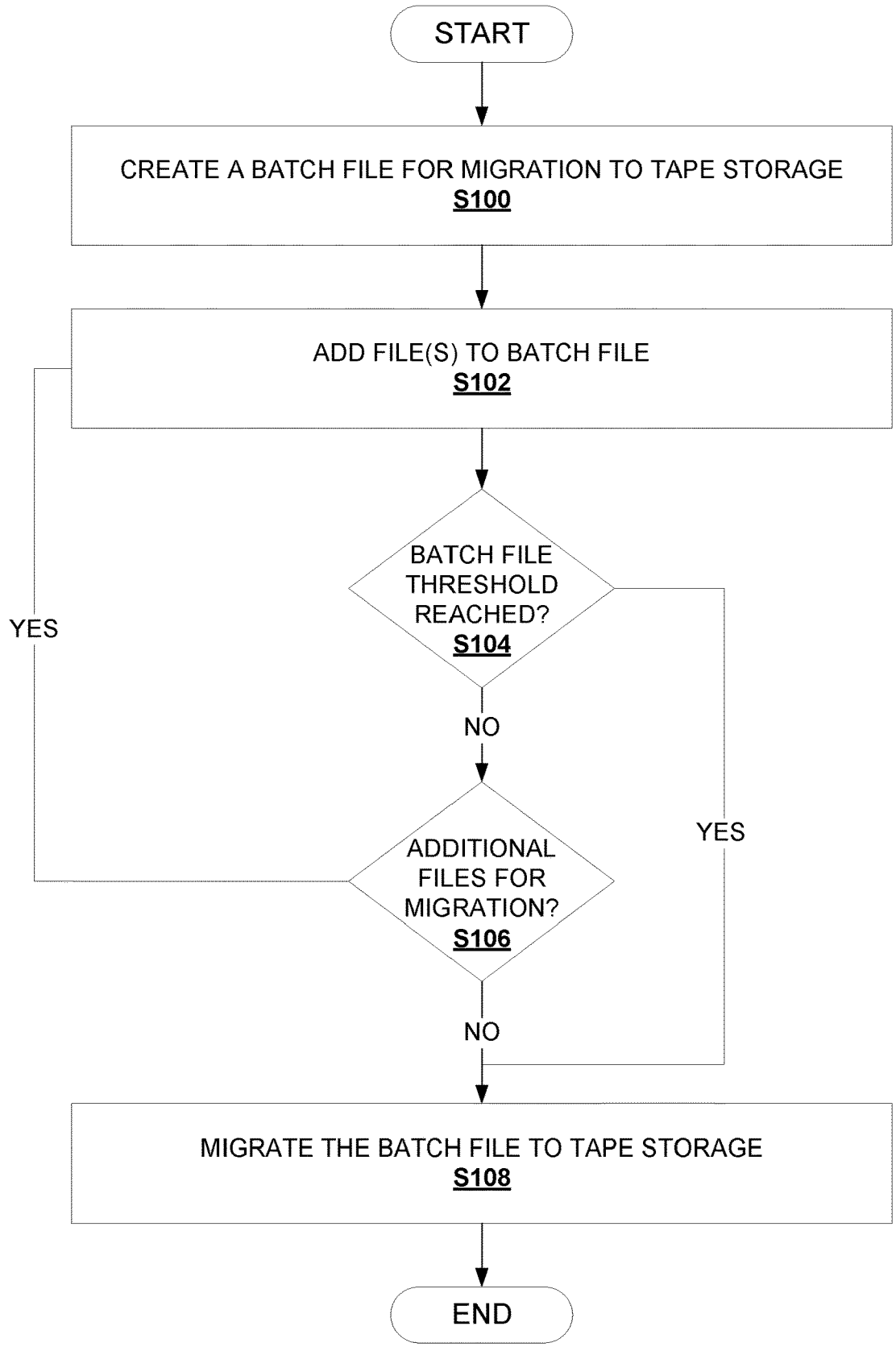
FIG. 1 is a flow chart diagram depicting operational steps for generating a group or batch of files for migration from a primary storage to a secondary storage in accordance with at least one embodiment of the present invention.

The use of hierarchical storage management allows an enterprise to reduce the cost of data storage, as well as simplify the retrieval of data from slower storage media. Typically, hierarchical storage management is used for deep archival storage of data that is required to be maintained for a prolonged period at low cost. The need for hierarchical storage management stems from the fact that high-speed storage devices (e.g., solid state drive arrays) are more expensive (per byte stored) than slower speed storage devices (e.g., hard disk drives, optical discs, and magnetic tape drives). With hierarchical storage management, infrequently used data files stored on high-speed storage media are migrated to slower speed storage media if the data files are not used (i.e., accessed) for a certain period of time. When access to the data files are required, data is copied or recalled from the secondary storage to the primary storage. In effect, hierarchical storage management turns a fast disk drive into a cache for the slower mass storage devices.

Generally, data in a hierarchical storage environment is migrated between tiered storage. For example, data is migrated between a primary, high-speed storage media (e.g., hard disk drives and/or solid-state disk drives) and a secondary, slower speed storage media (e.g., magnetic tape drives). The primary storage media (typically the faster storage device) is also known as a tape volume cache (TVC). Oftentimes, data is migrated from a primary, high-speed storage media to a secondary, slower speed storage media during off-peak hours or when workload requirements (e.g., read/write operations) of a storage system(s) is low. For example, batch jobs are collected when system workload requirements are high and later executed when system workload requirements are low.

Whereas data migration from primary storage to secondary storage is often a low priority, accessing data from a secondary storage (i.e., recalling data) is typically a high priority. This stems from the fact that data is oftentimes recalled from a secondary storage to a primary storage based on a relative immediate need for access to the data. For example, if a tape media storing the data to be recalled needs to be mounted on a tape drive currently undergoing a data migration, the tape drive finishes writing the migrated files and thereafter, the tape media is unmounted so that the tape media storing the data to be recalled can be mounted. Accordingly, embodiments of the present invention recognize that the amount of time that it takes to mount a new tape media on a tape drive, and thereby recall the data from the new tape media, is directly dependent on the amount of time it takes before the tape media being utilized for an ongoing migration can be unmounted.

Generally, within a hierarchical storage management system, files are not migrated from a primary storage to a secondary storage on an individual basis. Rather, groups or batches of files are created, in which an entire group or batch is migrated as a single entity. For example, a batch of ten (10) files is migrated from a primary storage device (e.g., a disk array) to a secondary storage device (e.g., a tape library), in which multiple batches of files are written (oftentimes simultaneously) to multiple tape media.

FIG. 1 is a flow chart diagram depicting operational steps for generating a group or batch of files for migration from a primary storage to a secondary storage in accordance with at least one embodiment of the present invention. More specifically, FIG. 1 illustrates a method for creating a group or batch of files for migration from a primary storage to a secondary storage, in which files selected for migration are added in sequential order (e.g., timewise) to a group or batch. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

At step S100, the method creates a batch file (i.e., group of files) for migration from a primary storage media to a secondary storage media, such as a tape media. For example, a batch file is created that contains one or more individual data files.

At step S102, the method adds files to the batch file. In some instances, files are added to the batch file in sequential order. For example, files are automatically added to the batch file in sequential order based on length of time since a file was last accessed. In other instances, files are randomly added to the batch file. For example, a predetermined number of files selected by a user or system administrator for migration are randomly added to the batch file.

At decision step S104, the method determines whether a predetermined threshold value for a batch file is reached. In some embodiments, the predetermined threshold value is a number of files included in the batch file. In other embodiments, the predetermined threshold value is a total data size of the files included in the batch file. If the predetermined threshold value for a batch file is reached (decision step S104 YES branch), the method proceeds to step S108. If the predetermined threshold value for a batch file is not reached (decision step S104 NO branch), the method proceeds to decision step S106.

At decision step S106, the method determines whether another file requires migration from the primary storage media to the secondary storage media. If another file requires migration from the primary storage media to the secondary storage media (decision step S106 YES branch), the method returns to step S102. If another file does not require migration from the primary storage media to the secondary storage media (decision step S106 NO branch), the method proceeds to step S108. At step S108, the method migrates the batch file from the primary storage media to the secondary media (e.g., tape media) and the process ends.

Typically, if a request to recall data occurs during migration of a batch file, the on-going migration is completed (i.e., any unwritten files contained in the batch file are written to the tape media) prior to unmounting the tape media so that the tape media storing the data to be recalled can be mounted. However, before a tape media being utilized for an ongoing migration can be unmounted from a tape drive, the following operations must be performed after the ongoing migration of a batch is completed: generating an index construct at the end of the data written to the data partition, generating an end of data (EOD) mark that serves as a designation of the end of the data written to the data partition of the tape media after the index construct, moving the tape media to the beginning of the index partition located at longitudinal position 3 (LP3), and overwriting the index located in the index partition with filesystem meta-data for the data newly migrated to the tape media.

Embodiments of the present invention recognize that the process of unmounting a tape media from a tape drive to which data is currently being migrated or written can be time consuming. Typically, upon completion of a data migration on a tape media, the distance between the position of a last write position <endlpos> (i.e., EOD mark) and longitudinal position 3 (LP3) on the tape media is random. Accordingly, on average, the amount of time required to position the tape head from <endlpos> to $LP_3$ is around 50 seconds. Furthermore, in a worst case scenario, if <endlpos> of the tape media is at the furthest possible distance from $LP_3$, the amount of time required to move the position the tape head from <endlpos> to $LP_3$ can be upwards of 100 seconds (depending on the Wrap length of the tape media). This stems from the fact that in order to return the tape head from a position near longitudinal position 4 ($LP_4$) to $LP_3$, almost the entire length of the tape media must be wound to return the tape head to $LP_3$. Accordingly, with increasing demand for faster, more powerful and more efficient ways to store and retrieve information, optimization of tape storage remains a key challenge in hierarchical storage systems.

Embodiments of the present invention provide one or more of: features, characteristics, operations and/or advantages to recalling data stored on a secondary storage device, such as magnetic tape media, and generally encompass (i) an improvement to at least the field of hierarchical storage management, and (ii) a technical solution to one or more of challenges in the field of hierarchical storage management. Such challenges in the field of hierarchical storage management may include, but are not limited to, one or more of: (i) limitations in the amount of time it takes before a first tape media can be unmounted from a tape drive in order to mount a second, different tape media on the tape drive, (ii) limitations in the amount of time required before a tape media being utilized for an ongoing migration of data can be unmounted from a tape drive, (iii) limitations in the amount of time it takes to recall or otherwise access data stored on a secondary storage media, such as a tape media, and (iv) limitations in the amount of time it takes to recall or otherwise access data stored on a first tape media that requires mounting on a tape drive that is in the process of writing data migrated from a primary storage media to another tape media. Certain embodiments of the present invention both recognize and address other challenges that are not specifically addressed herein, but are readily understood to be encompassed by the technical solutions described herein.

In various embodiments of the present invention, the size of a group or batch of files generated for migration from a primary storage media to a secondary storage media, such as a tape media, is based, at least in part, on an amount of data that can be written from (<endlpos>) to $LP_3$ on the tape media. In other words, a group or batch of files is generated based on an amount of available storage space on a tape media between (<endlpos>) and $LP_3$ on the tape media. In doing so, the tape head is positioned at or within a predetermined threshold distance of $LP_3$ upon completion of writing the batch file to the tape media. Accordingly, embodiments of the present invention reduce the amount of time to recall data (i.e., an amount of time required before a first tape media being utilized for migration of data can be unmounted in order to mount a second tape media containing the data to be recalled. This stems from the fact that when a recall occurs in accordance with embodiments of the invention, the amount of time required to move the tape head to overwrite an index located in the index partition is limited since the tape head will already be at or near the index located at $LP_3$ after completion of the migration.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 2:
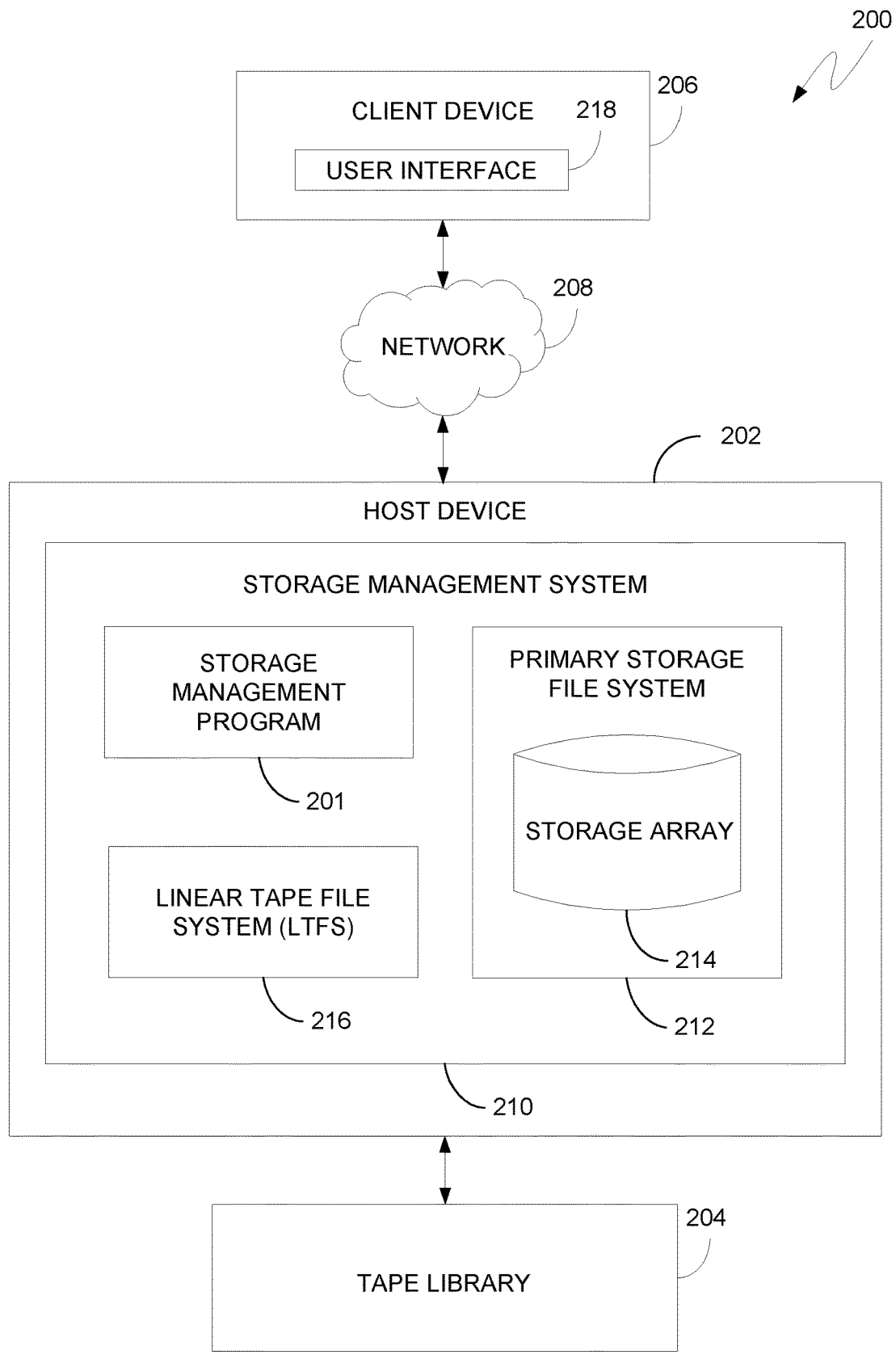
FIG. 2 is a functional block diagram of a network computing environment, generally designated 200, suitable for operation of a storage management program 201 in accordance with at least one embodiment of the present invention.

Referring now to various embodiments of the invention in more detail, FIG. 2 is a functional block diagram of a network computing environment, generally designated 200, suitable for operation of a storage management program 201 in accordance with at least one embodiment of the present invention. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

Network computing environment 200 includes host device 202, tape library 204, and client device 206 interconnected over network 208. In embodiments of the present invention, network 208 can be a telecommunications network, a local area network (LAN), a wide area network (WAN), such as the Internet, or a combination of the three, and can include wired, wireless, or fiber optic connections. In embodiments of the present invention, network 208 is a storage area network ("SAN"). Network 208 provides block-level network access to storage, such as tape library 204 and storage array 214. Network 208 may include one or more wired and/or wireless networks that are capable of receiving and transmitting data, voice, and/or video signals, including multimedia signals that include voice, data, and video information. In general, network 208 may be any combination of connections and protocols that will support communications between host device 202, tape library 204, client device 206, and other computing devices (not shown) within network computing environment 200.

In various embodiments of the present invention, host device 202 is a computing device that can be a standalone device, a management server, a web server, a mobile device, or any other electronic device or computing system capable of receiving, sending, and processing data. In other embodiments, host device 202 represents a server computing system utilizing multiple computers as a server system, such as in a cloud computing environment. In an embodiment, host device 202 represents a computing system utilizing clustered computers and components (e.g. database server computers, application server computers, web server computers, etc.) that act as a single pool of seamless resources when accessed within network computing environment 200. In general, host device 202 represents any programmable electronic device or combination of programmable electronic devices capable of executing machine readable program instructions and communicating with storage management program 201, tape library 204, client device 206, primary storage file system 212, storage array 214, linear tape file system (LTFS) 216, and other computing devices (not shown) within network computing environment 200 via a network, such as network 208.

Host device 202 includes storage management system 210. In various embodiments, storage management system 210 can migrate and recall data between a primary storage and a secondary storage. For example, storage management system 210 can be a Linear Tape File System-Enterprise Edition (LTFS-EE). While reference is made to IBM-specific hardware and/or software components, it should be understood that aspects of the present invention may be applied equally to other storage management library technologies. In various embodiments, storage management system 210 can be a local or cloud storage and backup system (e.g., a special storage device, group of devices, etc.) and software, firmware, etc., that can have hierarchical storage management functionality, whereby data can be migrated between tiered storage.

Storage management system 210 includes primary storage file system 212 and storage array 214. For example, primary storage file system 212 can be an IBM General Parallel File System (GBFS) for distributing and managing data across a primary storage, such as storage array 214, that can act as a cache for a secondary storage, such as tape media stored in tape library 204. While reference is made to IBM-specific hardware and/or software components, it should be understood that aspects of the present invention may be applied equally to other file system technologies.

Storage management system 210 further includes linear tape file system (LTFS) 216. A LTFS is a file system that allows files stored on tape media (e.g., tape cartridges) in a tape library to be accessed in a similar fashion as files stored on a hard disk or flash drive. It requires both a specific format of data on the tape media and software to provide a file system interface to the data. Each LTFS formatted tape media in the tape library appears as a separate folder under the filesystem mount point. One of ordinary skill in the art will appreciate that applying a file system to a tape drive allows users to organize and search the contents of tape media as they would on hard disk, improving access time for data stored on tape media. For example, LTFS 216 can be an IBM Linear Tape File System-Library Edition (LTFS-LE) that allows LTFS volumes (i.e., tape media) to be used with a tape library, such as tape library 204. While reference is made to IBM-specific hardware and/or software components, it should be understood that aspects of the present invention may be applied equally to other linear tape storage technologies.

In various embodiments, storage management system 210 can convert input/output requests directed to tape library 204 to storage array 214. For example, storage management system 210 receives a write request for a record initially directed to be stored on a tape media in tape library 204. However, rather than directly writing the data to a tape media of tape library 206, storage management program 210 writes (i.e., "saves" or "stores") the data as a logical volume (i.e., virtual volume) on a disk cache of storage array 214.

In various embodiments, storage management system 210 can migrate and/or recall data between a primary, high-speed storage media, such as a hard disk, and a secondary, slower speed storage media, such as a tape media. Accordingly, data may remain on storage array 214 until removal of the data is required, at which point, the data can be migrated to a tape media of tape library 204. For example, data can be migrated from a disk cache to a tape media based on an amount of free space on the disk cache falling below and/or equaling a predetermined threshold value. In another example, data can be migrated from a disk cache to a tape media based on length of time since a file was last accessed. In yet another example, data can be migrated from a disk cache to a tape media based on a user or system administrator selecting files for migration.

In various embodiments, storage management system 210 can receive read requests. Upon receiving a read request, storage management system 210 can determine whether the data is stored in storage array 214. If the requested data is stored in storage array 214, the data can be read from a disk in storage array 214. However, if the requested data is stored on a tape media in tape library 204, storage management system 210 can recall (i.e., load) the data from the tape media (e.g., a magnetic tape) in tape library 204 to a disk of storage array 214, such that the data is read from the disk. In some embodiments, if the requested data is stored on tape media in tape library 204, storage management system 210 does not load data from the tape media to a hard disk. In these embodiments, information can be read from the tape media.

Although various components of storage management system 210 are depicted in FIG. 2 as being integrated with host device 202, in alternative embodiments, various components of storage management system 210 can be remotely located from host device 202. For example, one or more of primary storage file system 212, storage array 214, and LTFS 216 can be located on one or more additional computing devices that are logically and/or physically distinct from host device 202.

Storage management system 210 further includes storage management program 201. Although storage management program 201 is depicted in FIG. 2 as being integrated with storage management program 210, in alternative embodiments, storage management program 201 can be remotely located from storage management system 210. In some embodiments, storage management program 201 can be a component of storage management system 210. For example, storage management program 201 can be a software component or sub-system of storage management 210. In other embodiments, storage management program 201 can be logically distinct from storage management program 201. For example, storage management program can be an application running outside of storage management system 210.

Tape library 204 can be an automated tape storage device that includes a plurality of tape drives for writing to and reading from tape media, such as, but not limited to, single-reel or two-reel magnetic tape cartridges. In an embodiment, tape library 204 can be an IBM TS3400™ Tape Library or an IBM TS3500™ Tape Library. While reference is made to IBM-specific hardware and/or software components, it should be understood that aspects of the present invention may be applied equally to other tape library technologies. In embodiments of the invention, tape library 204 can include a plurality of tape media stored in banks or groups of storage slots. For example, tape media may include, but is not limited to magnetic tape cartridges, magnetic tape cassettes, and optical tape cartridges. Tape library 204 can further include a plurality of slots to hold tape media (e.g., tape cartridges), a barcode reader to identify tape media and an automated method (e.g., a robot) for loading tape media.

Client device 206 can allow a user to access an application running on host device 202 and/or communicate with storage management program 201 via a network, such as network 208. Client device 206 may be a laptop computer, a tablet computer, a netbook computer, a personal computer (PC), a desktop computer, a personal digital assistant (PDA), a smart phone, or any programmable electronic device capable of receiving, sending, and processing data. In general, client device 206 represents any programmable electronic device or combination of programmable electronic devices capable of executing machine readable program instructions and communicating with host device 202, tape library 204, and other computing devices (not shown) within computing environment 200 via a network, such as network 208.

Client device 206 can include user interface 218. User interface 218 can provide an interface between client device 206, host device 202, and tape library 204. In some embodiments, user interface 218 can be a graphical user interface (GUI) or a web user interface (WUI) and can display text, documents, web browser windows, user options, application interfaces, and instructions for operation, and includes the information (e.g., graphic, text, and sound) presented to a user and the control sequences the user employs to control the program. In some embodiments, user interface 218 can be mobile application software that provides an interface between client device 206, host device 202, and tape library 204.

Figure 3:
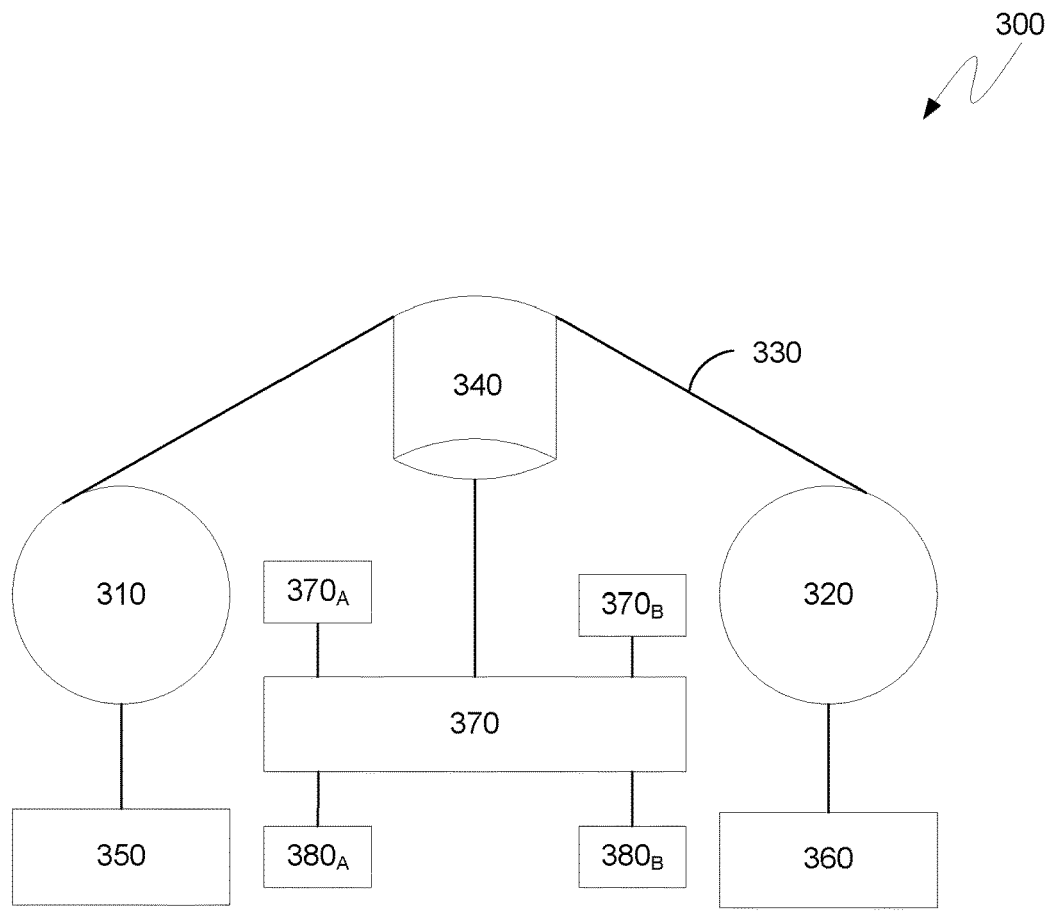
FIG. 3 is a block diagram illustrating a tape system, generally designated 300, in accordance with at least one embodiment of the present invention.

FIG. 3 is a block diagram illustrating a tape system, generally designated 300, in accordance with at least one embodiment of the present invention. FIG. 3 provides an illustration of only one implementation and does not imply any limitations with regard to the environments in which different embodiments may be implemented. Many modifications to the depicted environment may be made by those skilled in the art without departing from the scope of the invention as recited by the claims.

Tape system 300 includes first and second reels 310, 320. Magnetic recording tape 330 is spooled on the first and second reels 310, 320. Magnetic recording tape 330 is routed over tape head 340 for reading and writing data on magnetic recording tape 330. Reel motors 350, 360 control the positioning of magnetic recording tape 330 over the tape head 340. The reel 310, 320, which can supply tape at a particular time, can often be referred to as the "outboard" reel and the reel 310, 320, which can take up the tape at a particular time, can be referred to as the "inboard" reel. Reel motors 350, 360 can be controlled by control system 370, which can include one or more motor operation sensors $380_A$, $380_B$ and one or more tape radius sensors $370_A$, $370_B$ which can sense the radius R of magnetic recording tape 330 at the reel 310, 320 the motor 350, 360 is driving. Motor operation sensors $380_A$, $380_B$ can include electromotive force (EMF) sensors, for example.

FIG. 4A is a block diagram illustrating an example of data stored on a data partition of a tape media, generally designated 400, in accordance with at least one embodiment of the invention. FIG. 4A provides an illustration of only one implementation and does not imply any limitations with regard to the environments in which different embodiments may be implemented. Many modifications to the depicted environment may be made by those skilled in the art without departing from the scope of the present invention as recited by the claims.

One of ordinary skill in the art will appreciate that although data stored in a LTFS appears to behave like data stored on a hard disk, the fundamental sequential nature of writing data to tape media remains. Data is sequentially written to zones (i.e., logical blocks) of a predetermined, fixed size and files are always appended to the end of the tape media. Furthermore, a LTFS is a write-once file system. In other words, if a file stored on one or more data blocks is modified, overwritten or removed from a tape image, the associated data blocks are not freed up. Rather, the memory allocated to the associated data blocks becomes invalid (i.e., the associated data blocks are no longer referenced in an index) and newly added data is written as separate, non-contiguous blocks at the end of the tape media.

Furthermore, one of ordinary skill in the art will appreciate that unlike a read/write command for a block device, such as a hard disk, a read/write command issued to a tape drive does not specify a block number. In embodiments of the present invention, the position of data corresponding to a read/write request can be determined based on the current position of the tape media with respect to the tape head. The current position of the tape media can be retrieved by issuing a "Read Position" command. Similarly, the current position of the tape media can be set to any position by issuing a "Locate/Space" command. When a read/write command is successfully executed, the current position of the tape media is updated.

In embodiments of the present invention, data written to tape media stored in tape library 206 can include the following information: (i) record, (ii) file mark ("FM"), and (iii) end of data ("EOD") mark. The term "record" as used herein shall refer to a variable length data sequence on a tape media. The term "file mark" as used herein shall refer to a zero-length separator on a tape media that delimits data (i.e., records) of a particular file. The term "end of data mark" as used herein shall refer to a designation of the end of the data written to a tape media.

As depicted by FIG. 4A, data partition 400 includes Position 0, Position 1, Position 2, Position 3, Position 4, Position 5, and Position 6. Positions 0-6 demarcate physical units of data (i.e., data blocks) of data partition 400. In embodiments of the present invention, blocks can include a single record, part of a record, or multiple records. In some embodiments, data blocks can be fixed in size. In some embodiments, data blocks can be variable in size. Data partition 400 further includes: Rec #0, Rec #1, Rec #2, Rec #3, Rec #4, and Rec #5. Rec #0 and Rec #1 belong to the same file. Recs #2-#5 belong to the same file, and Rec #5 is the end of the data (as indicated by end of data (EOD) mark located at Position 6 written to data partition 400. In embodiments of the invention, when a "READ" command is issued, the current position of the tape head is updated. For example, if the current position of a tape head is at Position 1 and a "READ" command is issued for Rec #3, the tape head is moved to Position 3 and Rec #3 is read. Upon completion of reading Rec #3, the current position of the tape head is updated to Position 4.

FIG. 4B is a block diagram illustrating an example of data stored on a data partition of a tape media, generally designated 400, in accordance with at least one embodiment of the present invention. FIG. 4B provides an illustration of only one implementation and does not imply any limitations with regard to the environments in which different embodiments may be implemented. Many modifications to the depicted environment may be made by those skilled in the art without departing from the scope of the invention as recited by the claims.

Data partition 400 in FIG. 4B illustrates data partition 400 in FIG. 4A after a "WRITE" command is issued. In embodiments of the invention, a "WRITE" command can be issued for one or more of the following: (i) modifying a record, (ii) overwriting a record, and (iii) adding new data. Data partition 400 includes Position 0, Position 1, Position 2, Position 3, Position 4, Position 5, Position 6, and Position 7. Positions 0-6 on data partition 400 in FIG. 4B correspond to Positions 0-6 on data partition 400 in FIG. 4A. Data partition 400 in FIG. 4B further includes: Rec #0, Rec #1, Rec #2, Rec #3, Rec #4, Rec #5, and Rec #6. Recs #0-#5 on data partition 400 in FIG. 4B correspond to Recs #0-#5 on data partition 400 in FIG. 4A. In embodiments of the invention, "WRITE" operations can append data to the end of the tape media. As depicted by data partition 400 in FIG. 4B, a "WRITE" command has been issued. Accordingly, since Rec #5 was the last record written to data partition 400 at Position 5 (signified by the EOD mark at Position 6) in FIG. 4A, Rec #6 can be written at Position 6 on data partition 400 and the EOD mark can be updated to Position 7.

Figure 5:
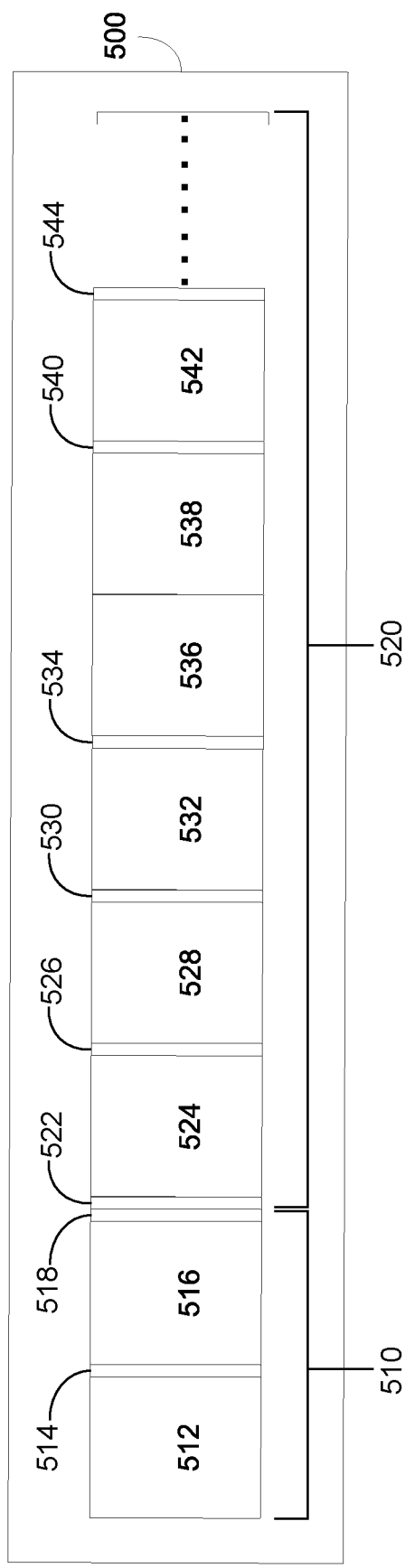
FIG. 5 is a block diagram illustrating an example of a complete partition containing data on a tape media, generally designated 500, in accordance with at least one embodiment of the present invention.

FIG. 5 is a block diagram illustrating an example of a complete partition containing data on a tape media, generally designated 500, in accordance with at least one embodiment of the present invention. FIG. 5 provides an illustration of only one implementation and does not imply any limitations with regard to the environments in which different embodiments may be implemented. Many modifications to the depicted environment may be made by those skilled in the art without departing from the scope of the invention as recited by the claims.

As depicted by FIG. 5, partition 500 includes Label Construct 510 and Content Area 520. Label Construct 510 includes Volume Label 512, File Mark 514, LTFS Label 516, and File Mark 518. Content Area 520 includes File Mark 522, Index Construct 524, File Mark 526, Data ExtentA (528), File Mark 530, Index Construct 532, File Mark 534, Data Extents (536 and 538), File Mark 540, Index Construct 542, and File Mark 544.

In various embodiments, a LTFS volume is comprised of a pair of LTFS partitions—a data partition (i.e., an LTFS partition primarily used for storing data files) and an index partition (i.e., an LTFS partition primarily used to store Index Constructs). Each partition in an LTFS volume includes a Label Construct followed by a Content Area. An LTFS construct as used herein shall be comprised of file marks and records (i.e., logical objects). One type of construct is a Label Construct, which contains identifying information for an LTFS volume. A second type of construct is a Data Extent, which contains file data written as sequential logical blocks. A file consists of zero or more data extents plus associated metadata stored in an Index Construct. A third type of construct is an Index Construct, which contains an index, which is an XML data structure which describes the mapping between files and Data Extents. The Index Construct consists of a file mark, followed by an index, followed by a file mark. The Index of an Index Construct consists of a record that follows the same rules as a Data Extent, but it does not contain file data. In other words, the Index of an Index Construct is written as a sequence of one or more logical blocks of size "block size" using the value stored in the LTFS Label. This sequence of blocks records the Index XML data that holds the file metadata and the mapping from files to Data Extents. The Index XML data recorded in an Index Construct is written from the start of each logical block used. Indexes can also include reference to other Indexes in the volume. References (e.g., back pointers and self pointers) to other Indexes can also be used to maintain consistency between partitions in a volume.

Figure 6:
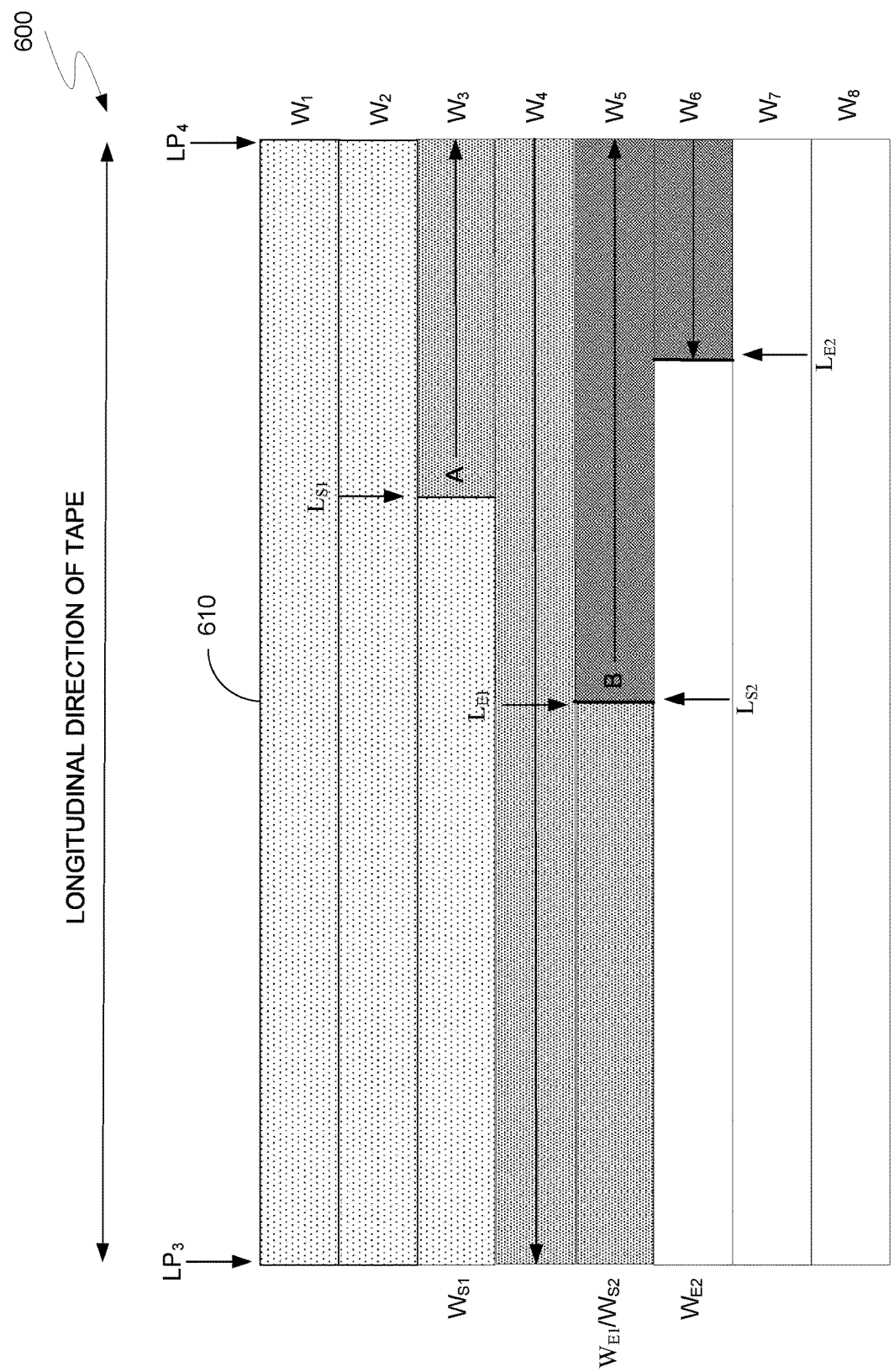
FIG. 6 is a block diagram illustrating an exemplary linear serpentine recording, generally designated 600, in accordance with at least one embodiment of the present invention.

FIG. 6 is a block diagram illustrating an exemplary linear serpentine recording, generally designated 600, in accordance with at least one embodiment of the present invention. More specifically, FIG. 6 is representative of a single tape head writing data to a data partition of a tape media. FIG. 6 provides an illustration of only one implementation and does not imply any limitations with regard to the environments in which different embodiments may be implemented. Many modifications to the depicted environment may be made by those skilled in the art without departing from the scope of the invention as recited by the claims.

One of ordinary skill in the art will appreciate that with a linear serpentine recording, a tape drive includes more tracks than tape heads, although each tape head only writes one track at a time. After making a pass over the whole length of the tape media, all heads shift slightly and make another pass in the reverse direction (i.e. Wrap), writing another set of tracks. This procedure is repeated until all tracks have been written.

Referring now to FIG. 6, a data partition 610 of a tape media can be seen, wherein $LP_3$ and $LP_4$ are a recording start position and a recording end position of the data storage area (i.e., data partition) in the longitudinal direction of the tape media, respectively. In the first Wrap ($W_1$), data is recorded from $LP_3$ to $LP_4$. In the second Wrap ($W_2$), data is reversely recorded from $LP_4$ to $LP_3$. In the third Wrap ($W_3$), data is recorded from $LP_3$ to $LP_4$. It should be appreciated that data may continue to be recorded in this alternating pattern based on a total Wrap capacity of the tape media. In various embodiments, an index partition including an index is stored at the beginning of the first Wrap.

As further depicted in FIG. 6, File "A" has been recorded from position $L_{S1}$ to position $L_{E1}$ on the tape media. More particularly, File "A" is recorded in Wrap $W_3$ from starting position $L_{S1}$ to $LP_4$, in Wrap $W_4$ from $LP_4$ to $LP_3$, and in Wrap $W_5$ from $LP_3$ to position $L_{E1}$. Additionally, File "B" has been recorded from position $L_{S2}$ to position $L_{E2}$ on the tape media. More particularly, File "B" is recorded in Wrap $W_5$ from position $L_{S2}$ to position $LP_4$, and in Wrap $W_6$ from position $LP_4$ to $L_{E2}$.

One of ordinary skill in the art will appreciate that although data block numbers are sequential on the tape media, data block numbers do not indicate the recording position and/or direction of recording (i.e., $LP_3$ to $LP_4$ or vice versa) of a record or file on the tape media itself. Rather, the recording position of a record or file on the tape media is indicated by a position in a longitudinal direction of storage on the tape media (hereinafter referred to as "LPOS") and a position in a lateral direction perpendicular to the longitudinal direction (hereinafter referred to as "Wrap"). However, although a tape drive reads and writes data based on LPOS and Wrap, a tape drive is unaware of which particular Wrap and LPOS of a particular Wrap a record or file is being recorded.

In various embodiments, when a record and/or file is recorded on a secondary storage media, such as a tape media, storage management program 201 obtains information on the recording position of the record and/or file. In these embodiments, a tape drive writes a record and/or file to a tape media, and storage management program 201 obtains the actual position of the record and/or file written on the tape media from the tape drive. More particularly, storage management program 201 identifies the particular Wrap and LPOS at the start of writing and the particular Wrap and LPOS at the end of writing a particular record and/or file from the tape drive. Storage management program 201 stores the information on the recording position of the record and/or file in an index on a primary storage media, such as hard disk drive in storage array 214, and on a secondary storage media, such as a tape media in tape library 204, for read access to the record and/or file.

In some embodiments, storage management program 201 obtains (e.g., via a small computer system interface (SCSI) command) Wrap and LPOS information from sense data or mode page data indicating the operating state of a tape drive. In these embodiments, the sense data and mode page data can include, in addition to information on a record and/or file recording start position and end position, the positional information of the head, from which the Wrap and LPOS of the head can be obtained. In other embodiments, storage management program 201 obtains Wrap and LPOS information via a command to specify write data and obtain Wrap and LPOS from a tape drive.

Referring back to FIG. 6, after data is recorded on the tape media, storage management program 201 obtains information on the starting longitudinal position ($L_{S1}$) and ending longitudinal position ($L_{E1}$) of File "A" written to data partition 610 of the tape media. Similarly, storage management program 201 obtains information on the starting longitudinal position ($L_{S2}$) and ending longitudinal position ($L_{E2}$) of File "B" written to data partition 610 of the tape media. Additionally, storage management program 201 obtains the starting Wrap ($W_{S1}$) and the ending Wrap ($W_{E1}$) of positions $L_{S1}$ and $L_{E1}$. Similarly, storage management program 201 obtains the starting Wrap ($W_{S2}$) and the ending Wrap ($W_{E2}$) of positions $L_{S2}$ and $L_{E2}$. Accordingly, an extent for File "A" including $L_{S1}$ at $W_{S1}$ (i.e., Wrap $W_3$) and $L_{E1}$ at $W_{E1}$ (i.e., Wrap $W_5$) is appended to an index. Similarly, an extent for File "B" including $L_{S2}$ at $W_{S2}$ (i.e., Wrap $W_5$) and $L_{E2}$ at $W_{E2}$ (i.e., Wrap $W_6$) is appended to an index. In some embodiments, storage management program 201 stores the information associated with the recording positions as extents in an index on a primary storage media, such as a hard disk in disk array 216 (shown in FIG. 2). In other embodiments, storage management program 201 issues a command to the tape drive to write the information associated with the recording position as extents in an index on the tape media.

FIG. 7 is an exemplary index, generally designated 700, including Wrap and LPOS information obtained in accordance with at least one embodiment of the present invention. More particularly, FIG. 7 illustrates Wrap and LPOS information recorded as an extent in an index located in an index partition of a tape media. FIG. 7 provides only an illustration of only one implementation and does not imply any limitations with regard to the environments in which different embodiments may be implemented. Many modifications to the depicted environment may be made by those skilled in the art without departing from the scope of the invention as recited by the claims.

As depicted in FIG. 7, an extent 710 created in index 700 containing Wrap and LPOS information of data written to a tape media can be seen. The boldfaced portion of the index is extent 710, of which the bolded, italicized portion of extent 710 is the information corresponding to the recording position of the record and/or file. In various embodiments, the information written to an extent includes, but is not limited to: (i) the offset of the file (<fileoffset>), (ii) the block number at which recording of the file is started (<startblock>), (iii) the byte count (<bytecount>), (iv) the file-recording start position (<startwrap> and <startlpos>), and (v) the file-recording end position (<endwrap> and (<endlpos>).

Figure 8:
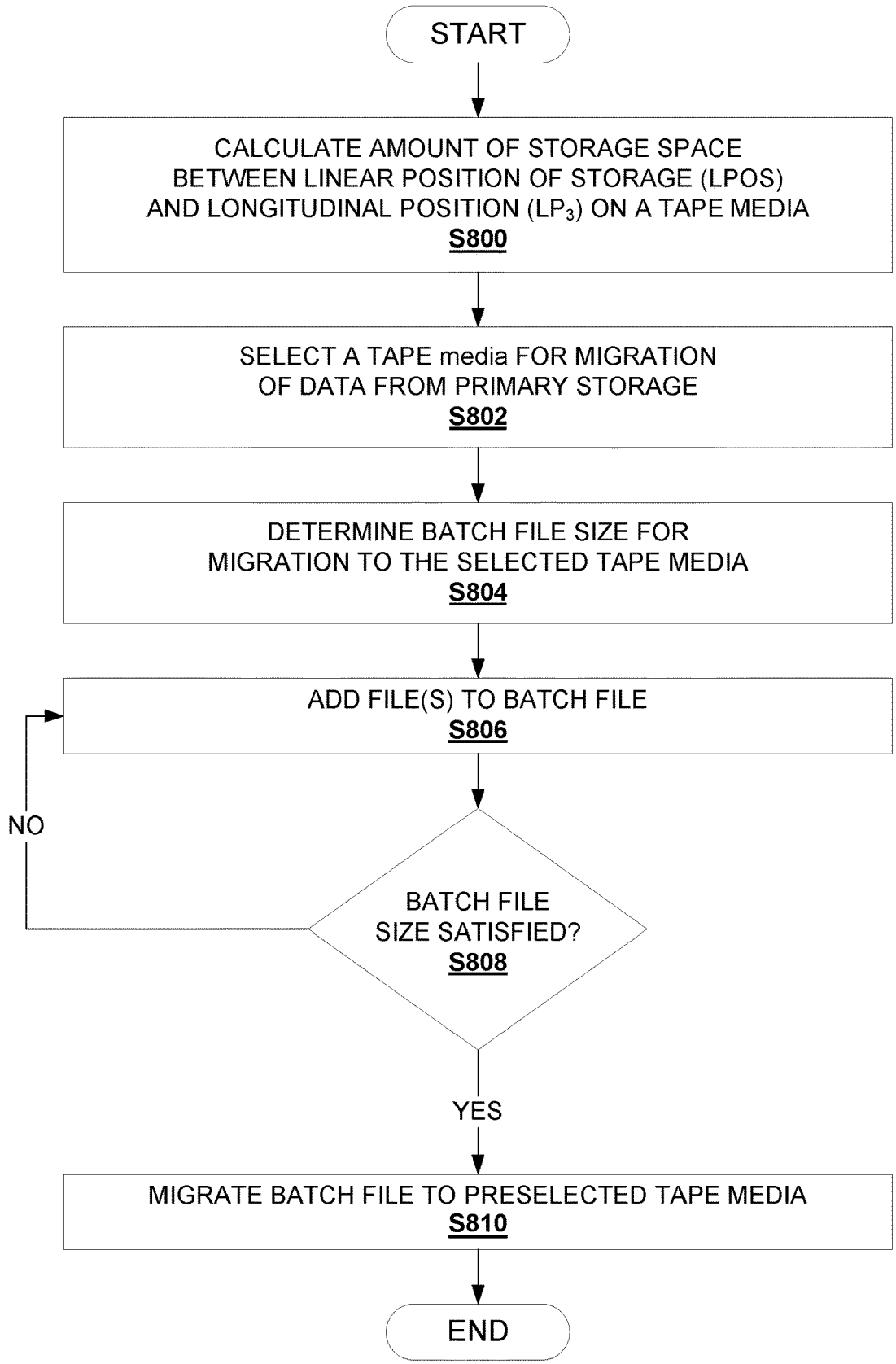
FIG. 8 is a flow chart diagram depicting operational steps for generating a group or batch of files for migration from a primary storage media to a secondary storage media in accordance with at least one embodiment of the present invention.

FIG. 8 is a flow chart diagram depicting operational steps for generating a group of files to be migrated from a primary storage media to a secondary storage media in accordance with at least one embodiment of the present invention. More specifically, FIG. 8 illustrates an algorithm for creating a group or batch of files for migration to a tape media, in which the size of a group or batch of files generated is based on an amount of data that can be stored between a LPOS (<endwrap> and <endlpos>) and $LP_3$ on the tape media. FIG. 8 provides an illustration of only one implementation and does not imply any limitations with regard to the environments in which different embodiments may be implemented. Many modifications to the depicted environment may be made by those skilled in the art without departing from the scope of the invention as recited by the claims.

At step S800, storage management program 201 calculates the size (R) of data that can be written to a tape media (T) between LPOS (<endwrap> and <endlpos>) and $LP_3$ on the tape media. One of ordinary skill in the art will appreciate that the amount of data (i.e., storage capacity) that can be written in a single Wrap can be determined based on the type (i.e., manufacturer and model) of tape media. For example, if a tape cartridge has a maximum capacity of 300 GB and a total Wrap count of 10, then each Wrap can store 30 GB of data. Thus, the amount of free data space between LPOS (<endwrap> and <endlpos>) and LP3, and therefore, the amount of data that can be written between LPOS and LP3, can be determined.

In those embodiments where storage management program 201 calculates R(T) for an unmounted tape media stored in tape library 204, R(T) is calculated based on the LPOS (i.e., <endwrap> and <endlpos>) and $LP_3$ on the tape media. In some embodiments, where storage management program 201 calculates R(T) for a tape media utilized during an ongoing migration, R(T) is calculated based on the LPOS (<endwrap> and <endlpos>) upon completion of writing a currently migrated record and/or file to the tape media.

At step S802, storage management program 201 selects a tape media for migration of data from a primary storage media. In various embodiments, storage management program 201 selects a tape media based on, but not limited to, one or more of the following: tape media having at least a predetermined amount of available storage space, the amount of available storage space on a tape media, an amount of storage space between a LPOS (i.e., <endwrap> and <endlpos>) and $LP_3$ on the tape media, whether a tape media is currently mounted on a tape drive or unmounted (e.g., archived in a tape library), and (v) whether a tape drive is currently migrating data to a mounted tape media.

At step S804, storage management program 201 determines a group or batch file size for migration of data from a primary storage media to the selected tape media. In various embodiments, the size of the group or batch of files is based on an amount of available storage space between the LPOS (i.e., <endwrap> and <endlpos>) and $LP_3$ on the tape media. In other words, the size of a group or batch of files is calculated such that a tape head is positioned at or within a predetermined threshold distance of $LP_3$ upon completion of writing the group or batch of files to a selected tape media. In some embodiments, the predetermined threshold distance of a tape head position with respect to $LP_3$ is on a particular Wrap having a longitudinal recording direction from left to right (i.e., from $LP_3$ to $LP_4$). In some embodiments, the predetermined threshold distance of a tape head position with respect to $LP_3$ is on a particular Wrap having a longitudinal recording direction from right to left (i.e., from $LP_4$ to $LP_3$).

In some embodiments, the size of the batch file is based on an amount of available storage space between the LPOS (i.e., <endwrap> and <endlpos>) and the next successive $LP_3$ on the tape media. In other words, the size of a group or batch of files is calculated such that a tape head is positioned at or within a predetermined threshold distance of the next successive $LP_3$ upon completion of writing the group or batch of files to a selected tape media.

Figure 9:
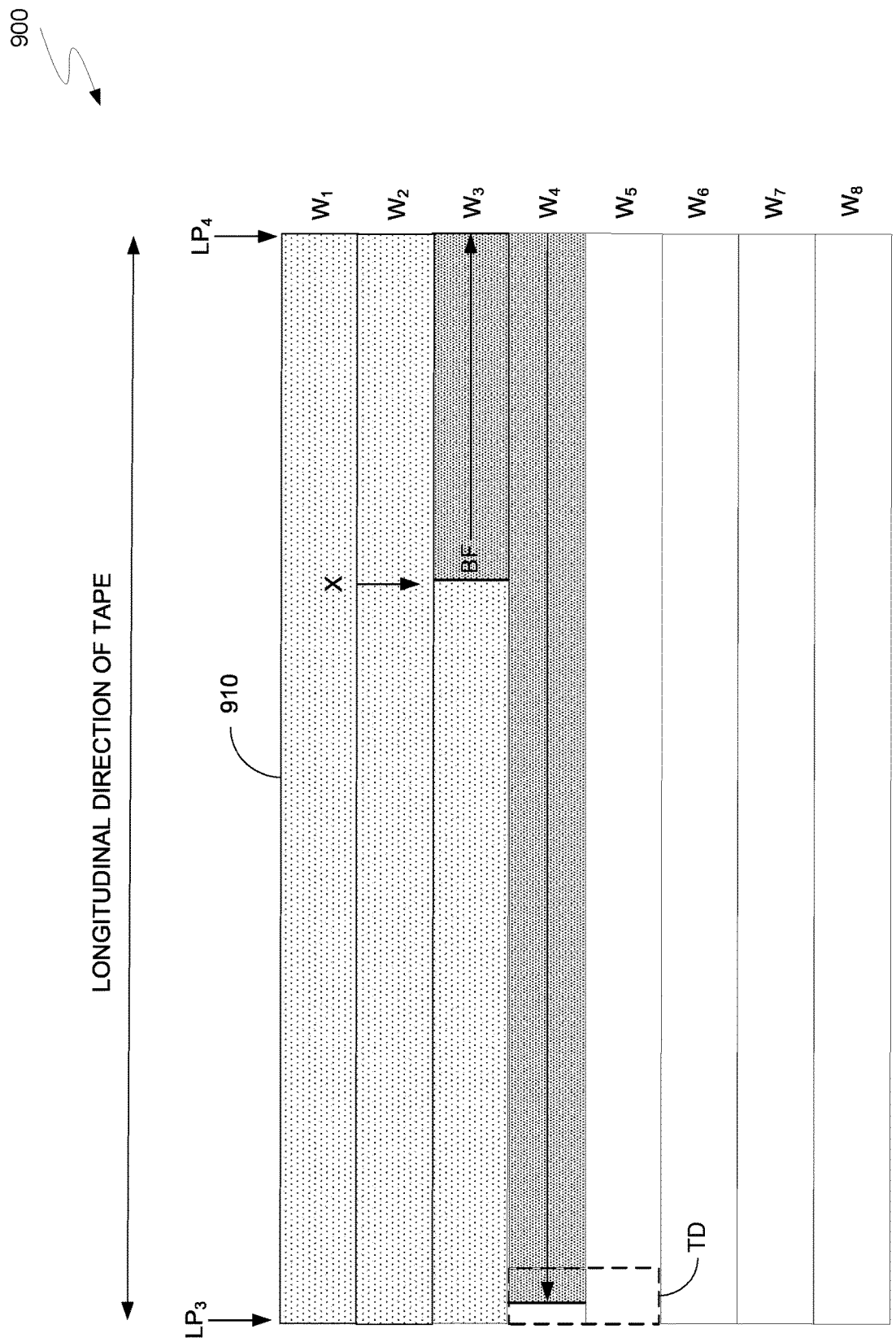
FIG. 9 is a block diagram illustrating an exemplary linear serpentine recording, generally designated 900, after migrating a group or batch of files from a primary storage media to a secondary storage media in accordance with at least one embodiment of the process illustrated in FIG. 8.

Referring now to FIG. 9, a block diagram illustrating an exemplary linear serpentine recording, generally designated 900, after migrating a group or batch of files from a primary storage to a secondary storage in accordance with at least one embodiment of the process illustrated in FIG. 8 can be seen. For example, if <endlpos> is "X" and <endwrap> is Wrap $W_3$, and the next successive LP3 is on Wrap $W_4$, then the amount of available storage space R(T) is the amount of available storage space from position "X" to position $LP_4$ on Wrap $W_3$, plus the amount of available storage space from position $LP_4$ on Wrap $W_4$ to the position $LP_3$ on Wrap $W_4$. Accordingly, in this example, storage management program 201 would generate a batch file (BF) that contains an amount of data such that after writing the batch file to the selected tape media, the <endlpos> is within a threshold distance (TD) of $LP_3$ on Wrap $W_4$.

Figure 10:
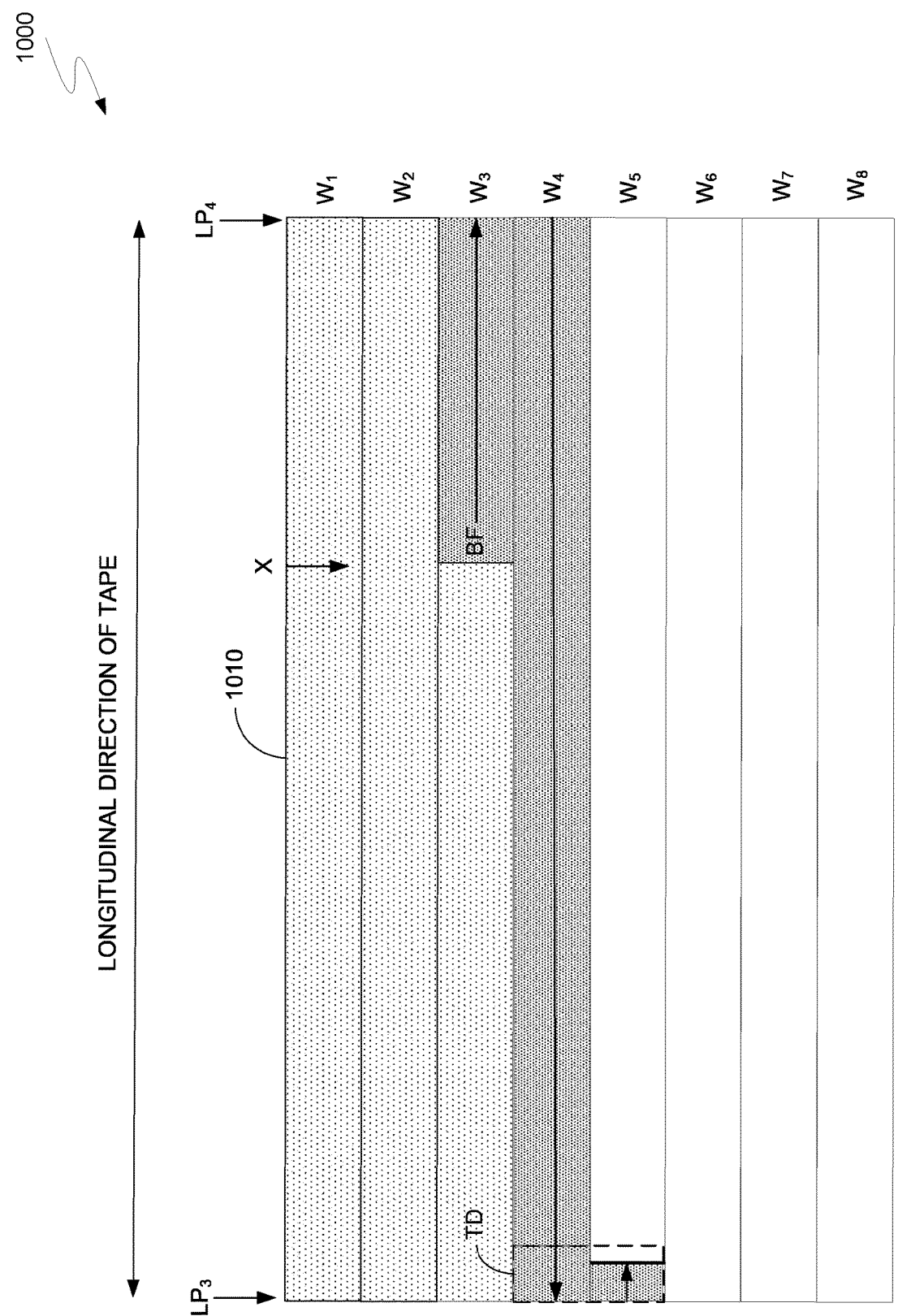
FIG. 10 is a block diagram illustrating an exemplary linear serpentine recording, generally designated 1000, after migrating a group or batch of files from a primary storage media to a secondary storage media in accordance with at least one embodiment of the process illustrated in FIG. 8.

Referring now to FIG. 10, a block diagram illustrating an exemplary linear serpentine recording, generally designated 1000, after migrating a group or batch of files from a primary storage media to a secondary storage media in accordance with at least one embodiment of the process illustrated in FIG. 8 can be seen. For example, if <endlpos> is "X" and <endwrap> is Wrap $W_3$, and the next successive $LP_3$ is on Wrap $W_4$, then the amount of available storage space R(T) is the amount of available storage space from position "X" to position $LP_4$ on Wrap $W_3$, plus the amount of available storage space from position $LP_4$ on Wrap $W_4$ to the position $LP_3$ on Wrap $W_4$. Accordingly, in this example, storage management program 201 would generate a batch file (BF) that contains an amount of data such that after writing the batch file to the selected tape media, the <endlpos> is within a threshold distance (TD) of $LP_3$ on Wrap $W_5$.

In some embodiments, the size of the batch file is based on an amount of available storage space between the LPOS (i.e., <endwrap> and <endlpos>) and any subsequent $LP_3$ on the tape media. In other words, the size of a group or batch of files is calculated such that a tape head is positioned at or within a predetermined threshold distance of a subsequent $LP_3$ upon completion of writing the group or batch of files to a selected tape media. For example, referring back to FIG. 8, if <endlpos> is "X" and <endwrap> is Wrap $W_3$, the next $LP_3$ would be at the end of Wrap $W_4$, the next $LP_3$ thereafter would be at the beginning of Wrap $W_5$, and the next $LP_3$ thereafter would be at the end of Wrap $W_6$. Thus, if storage management program 201 selects $LP_3$ at the end of Wrap $W_6$, then the amount of available storage space R(T) from position "X" and $LP_3$ at the end of Wrap $W_6$ is the amount of available storage space from position "X" to position $LP_4$ on Wrap $W_3$, plus the amount of available storage space from position $LP_4$ on Wrap $W_4$ to the position $LP_3$ on Wrap $W_4$, plus the amount of available storage space from position $LP_3$ on Wrap $W_5$ to the position $LP_4$ on Wrap $W_5$, plus the amount of available storage space from position $LP_4$ on Wrap $W_6$ to the position $LP_3$ on Wrap $W_6$. Accordingly, in this example, storage management program 201 would generate a batch file that contains an amount of data such that after writing the batch file to the selected tape media, the <endlpos> is within a threshold distance of $LP_3$ on Wrap $W_6$ or within a threshold distance of $LP_3$ on Wrap $W_7$.

In some embodiments, storage management program 201 performs parallel migration of batch files. In these embodiments, storage management program 201 selects a number of tape media for migration of data. Thus, the size of each batch file generated for parallel processing is based on an amount of available storage space between the LPOS and a position LP3 of particular tape media selected for data migration.

Returning back to FIG. 8, at step S806, storage management program 201 adds individual files to the batch file. In various embodiments, storage management program 201 adds individual files to the batch file based on an amount of available storage space between the LPOS (i.e., <endwrap> and <endlpos>) and $LP_3$ on the tape media. In other words, storage management program 201 adds files to the batch file until the amount of data of the batch file is such that a tape head is positioned at or within a predetermined threshold distance of $LP_3$ upon completion of writing the group or batch of files to a selected tape media.

In some embodiments, files are added to the batch file in sequential order. For example, files are automatically added to the batch file in sequential order based on length of time since a file was last accessed. In other embodiments, files are randomly added to the batch file. For example, random files are selected irrespective of the length of time since a file was last accessed. In any of these embodiments, storage management program 201 adds individual files to the batch file such that the batch file size falls within a predetermined range of an amount of available storage space between a LPOS and a position $LP_3$ of a tape media previously selected for migration of data.

At decision step S808, storage management program 201 determines whether the size of the batch file is such that a tape head will be positioned at or within a predetermined distance of $LP_3$ upon completion of writing the group or batch of files to a selected tape media. In some embodiments, files added to the batch file undergo data compression, and as a result, are migrated as compressed files within the batch file. In these embodiments, storage management program 201 determines a predicted size of the batch file after compression when calculating the total size of the files included in the batch file. For example, storage management program 201 determines a predicted size based on a predetermined compression rate for a particular file extension corresponding to the batch file. In other embodiments, files added to the batch file do not undergo data compression. In these embodiments, storage management program 201 determines an actual size of the batch file.

If storage management program 201 determines that the size of the batch file is such that a tape head will not be positioned at or within a predetermined threshold distance of $LP_3$ upon completion of writing the group or batch of files to a selected tape media (decision step S808 NO branch), storage management program 201 returns to step S806. In some embodiments, the size of the batch file is determined to be too small such that a tape head will be positioned greater than a predetermined threshold distance of $LP_3$ upon completion of writing the group or batch of files to a selected tape media. In some embodiments, the size of the batch file is determined to be too large such that a tape head will be positioned greater than a predetermined threshold distance of $LP_3$ upon completion of writing the group or batch of files to a selected tape media.

If storage management program 201 determines that the size of the batch file is such that a tape head will be positioned at or within a predetermined threshold distance of $LP_3$ upon completion of writing the group or batch of files to a selected tape (decision step S808 YES branch), storage management program 201 stops adding files and migrates the batch file to the preselected tape media at step S810.

Figure 11:
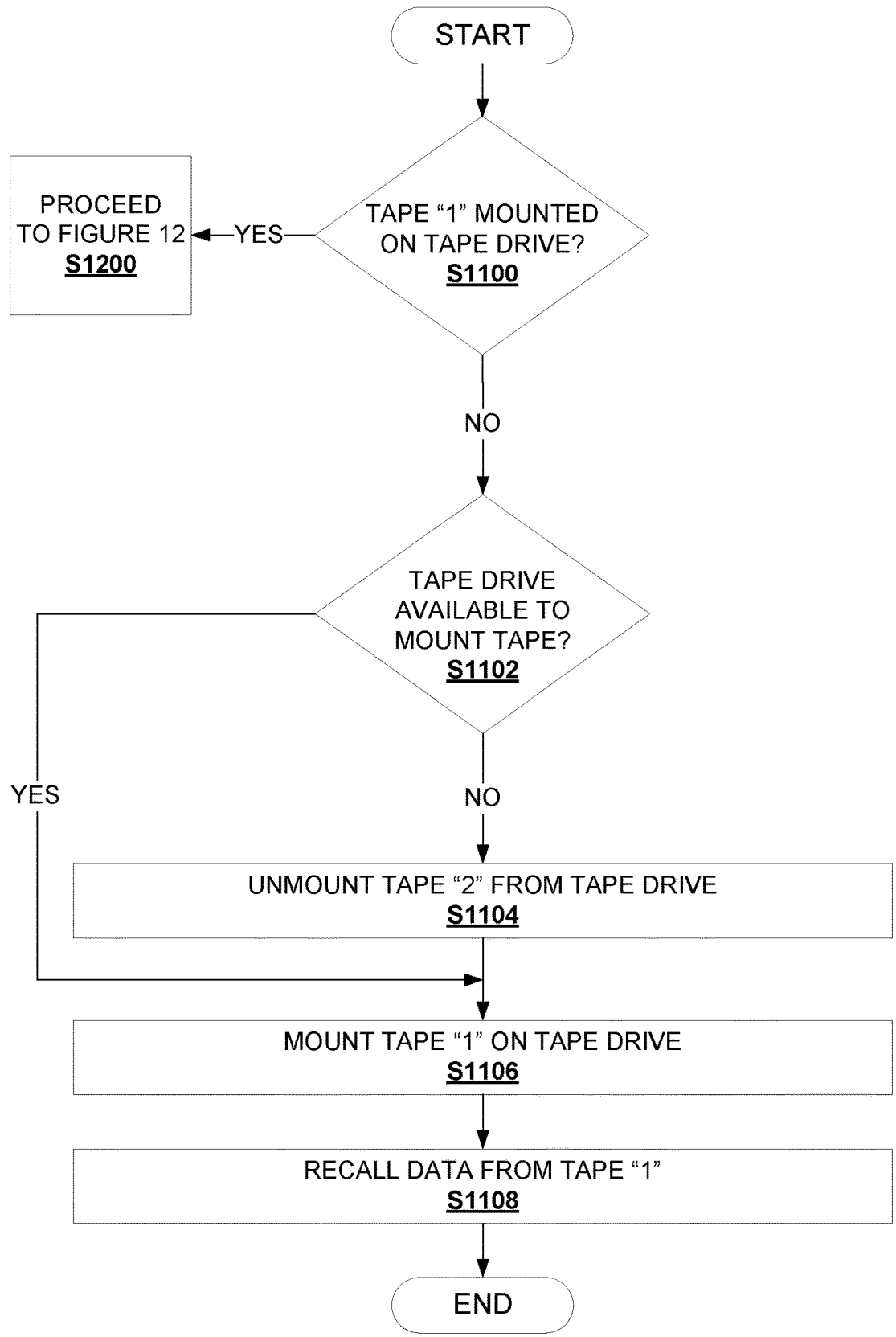
FIG. 11 is a flow chart diagram depicting operational steps for recalling data stored on an unmounted tape media in accordance with at least one embodiment of the present invention.

FIG. 11 is a flow chart diagram depicting operational steps for recalling data stored on an unmounted tape media in accordance with at least one embodiment of the present invention. FIG. 11 provides an illustration of only one implementation and does not imply any limitations with regard to the environments in which different embodiments may be implemented. Many modifications to the depicted environment may be made by those skilled in the art without departing from the scope of the invention as recited by the claims.

At decision step 1100, storage management program 201 determines whether the tape media storing the data to be recalled is mounted on a tape drive. If storage management program 201 determines that the tape media storing the data to be recalled is not mounted on a tape drive (decision step S1100 NO branch), storage management program 201 proceeds to step S1102. If storage management program 201 determines that the tape media storing the data to be recalled is mounted on a tape drive (decision step S1100 YES branch), storage management program 201 proceeds to decision step S1200 of FIG. 12.

At decision step S1102, storage management program 201 determines whether a tape drive is available for mounting the tape media storing the data to be recalled. For example, a tape drive is available for mounting a tape media if another tape media is not currently mounted on the tape drive. If storage management program 201 determines that a tape drive is currently unavailable to mount the tape media storing the data to be recalled (decision step S1102 NO branch), storage management program 201 proceeds to step S1104. If storage management program 201 determines that a tape drive is currently available to mount the tape media storing the data to be recalled (decision step S1102 YES branch), storage management program 201 proceeds to step S1106.

At step S1104, storage program 201 unmounts a tape media from a tape drive. In some instances, a tape drive cannot be unmounted because of an ongoing migration (i.e., the tape drive is currently writing data to a tape media). In an embodiment, storage management program 201 can unmount a tape media upon completion of the data migration. In an embodiment, storage management program 201 can unmount a tape media after pausing or otherwise suspending an on-going migration. For example, storage management program 201 can suspend an on-going migration in response to determining that no tape drives are available for mounting the tape media storing the data to be recalled.

In embodiments of the present invention, prior to unmounting a tape media from a tape drive undergoing a data migration, the following operations, irrespective of whether a migration is completed or suspended, can be performed: generating an index construct at the end of the data written to the data partition, generating an end of data (EOD) mark that serves as a designation of the end of the data written to the data partition of the tape media after the index construct, moving the tape media to the beginning of the index partition located at LP3, and overwriting the index located in the index partition with filesystem meta-data (e.g., filename, date stamps, folder names, and location of the file content) for the data newly migrated to the tape.

Typically, upon completion of a data migration to a tape media, the distance between the <endlpos> of the tape media and $LP_3$ is random. Accordingly, on average, the amount of time required to position the tape head from <endlpos> to $LP_3$ is around 50 seconds. Furthermore, in a worst case scenario, if <endlpos> is at the furthest possible distance from $LP_3$ on the tape media, the amount of time required to position the tape head from <endlpos> to LP3 can be upwards of 100 seconds (depending on the Wrap length of the tape media). This stems from the fact that in order to return the tape head from a position near LP4 to $LP_3$, almost the entire length of the tape media must be wound to return to $LP_3$ on the tape media.

However, according to embodiments of the present invention, the amount of time required to unmount a tape media is reduced to several seconds. This stems from the fact that batch files are created such that upon completion of migrating a batch file to a particular tape media, the <endlpos> on the tape media is at or near LP3. Accordingly, the amount of time required to move the position the tape head from <endlpos> to the beginning of the index partition located at LP3 (and thereby unmount a tape media) is substantially reduced.

At step S1106, storage management program 201 mounts the tape media storing the data to be recalled on an available tape drive. For example, storage management program 201 issues a mount command to tape library 206 to retrieve the tape media from tape library 206 and mount the tape media on a tape drive.

At step S1108, storage management program 201 recalls the data from the tape media and the process ends. For example, storage management program 201 issues a read command to the tape drive, thereby updating the current position of the tape head to the beginning of the data to be recalled from the tape media.

Figure 12:
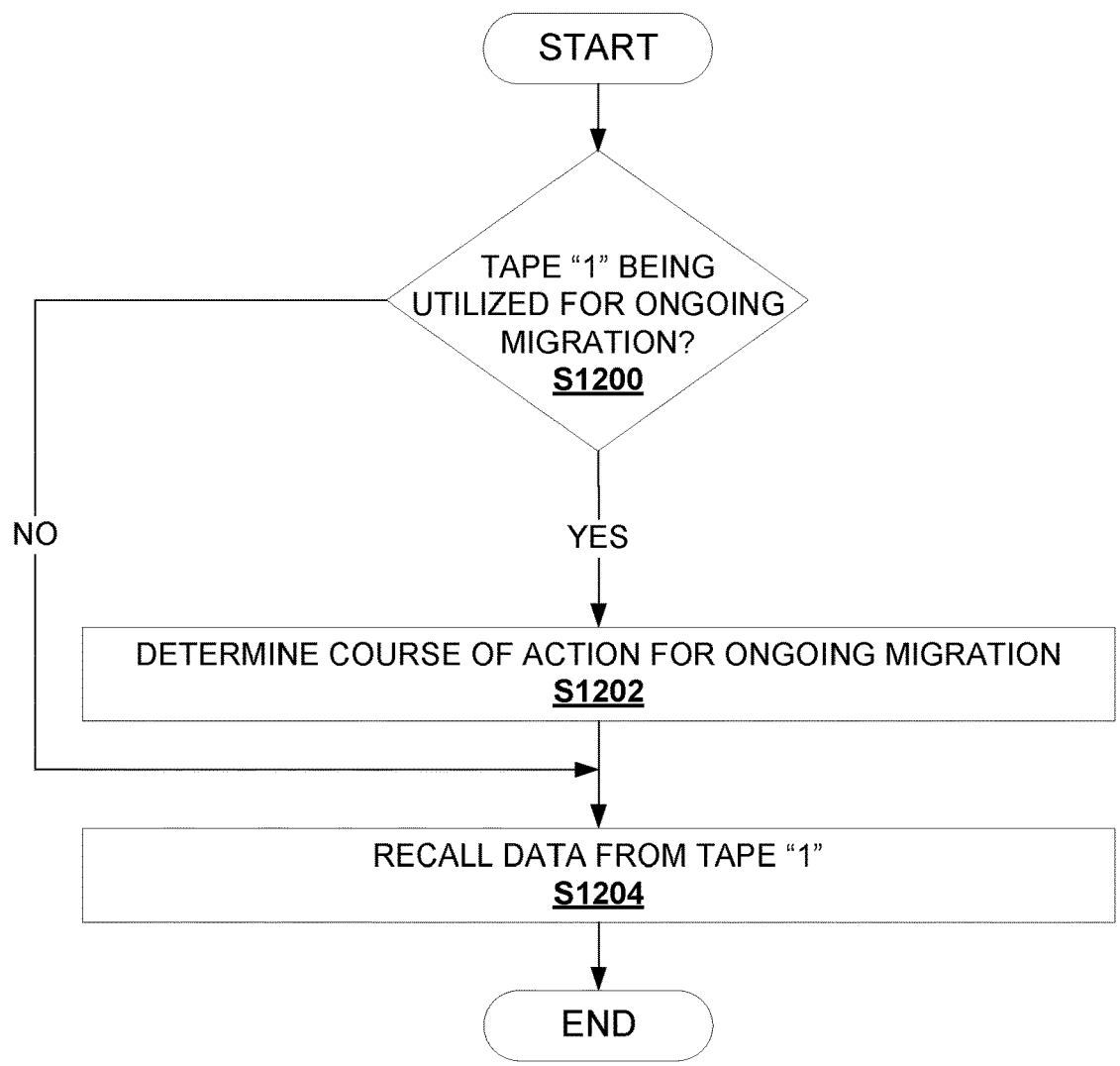
FIG. 12 is a flow chart diagram depicting operational steps for recalling data stored on a mounted tape media in accordance with at least one embodiment of the present invention.

FIG. 12 is a flow chart diagram depicting operational steps for recalling data stored on a mounted tape media in accordance with at least one embodiment of the present invention. FIG. 12 provides an illustration of only one implementation and does not imply any limitations with regard to the environments in which different embodiments may be implemented. Many modifications to the depicted environment may be made by those skilled in the art without departing from the scope of the invention as recited by the claims.

At decision step S1200, storage program 201 determines whether the tape media storing the data to be recalled is being utilized for an ongoing migration (i.e., a tape drive is currently writing data to the tape media). If storage management program 201 determines that the tape media storing the data to be recalled is being utilized for an ongoing migration (decision step S1200 YES branch), storage management program 201 proceeds to step S1202. If storage management program 201 determines that the tape media storing the data to be recalled is not being utilized for an ongoing migration (decision step S1200 NO branch), storage management program 201 proceeds to step S1204.

At step S1202, storage management program 201 determines a course of action for the ongoing migration. In some embodiments, storage management program 201 waits for the ongoing migration of data written to the tape media storing the data to be recalled to be completed. In some embodiments, storage management program 201 stops the ongoing migration of data written to the tape media storing the data to be recalled when the position of the tape head is within a predetermined threshold distance of $LP_3$, regardless of whether or not the entire batch file has been migrated to the tape media. In some embodiments, storage management program 201 pauses or otherwise suspends the ongoing migration of data written to the tape media storing the data to be recalled. For example, storage management program 201 suspends an on-going migration in response to determining that the tape media storing the data to be recalled is being utilized for an ongoing migration.

At step S1204, storage management program 201 recalls the data from the tape media. For example, storage management program 201 issues a read command to the tape drive, thereby updating the current position of the tape head to the beginning of the data to be recalled from the tape media. In some embodiments, prior to updating the current position of the tape head to the beginning of the data to be recalled, the following operations can be performed: (i) appending an index construct at the end of the data written to the data partition, (ii) appending an end of data (EOD) mark at the end of the index construct that serves as a designation of the end of the data written to the data partition of the tape media, (iii) moving the tape media to the beginning of the index partition located at LP3, and (iv) overwriting the index located in the index partition with filesystem meta-data (e.g., filename, date stamps, folder names, and location of the file content) for the data newly migrated to the tape media. Accordingly, in these embodiments, information about the data migrated to the tape media can be appended to an index construct and the index located in the index partition is overwritten prior to recalling the data.

In other embodiments, information about the data migrated to the tape media can be appended to an index construct and the index located in the index partition is overwritten after recalling the data. In these embodiments, one or more of the following operations can be performed after recalling the data from the tape media: (i) appending an index construct at the end of the data written to the data partition, (ii) appending an end of data (EOD) mark at the end of the index construct that serves as a designation of the end of the data written to the data partition of the tape media, (iii) moving the tape media to the beginning of the index partition located at LP3, and overwriting the index located in the index partition with filesystem meta-data (e.g., filename, date stamps, folder names, and location of the file content) for the data newly migrated to the tape media. For example, storage management program 201 obtains and temporarily stores information to be appended in the index on a primary storage media, such as disk cache of storage array 116. Upon completion of the data recall, storage management program 201 transmits the information temporarily stored back to the tape drive to be appended to the index. It should be appreciated that by appending an index construct at the end of the data in the data partition and/or overwriting the index located in the index partition after recalling the data, the data can be recalled faster because the tape head position does not have to be moved to the index partition of the tape media (located at $LP_3$) and then again moved to a position on the tape media corresponding to the beginning of the data to be recalled.

Figure 13:
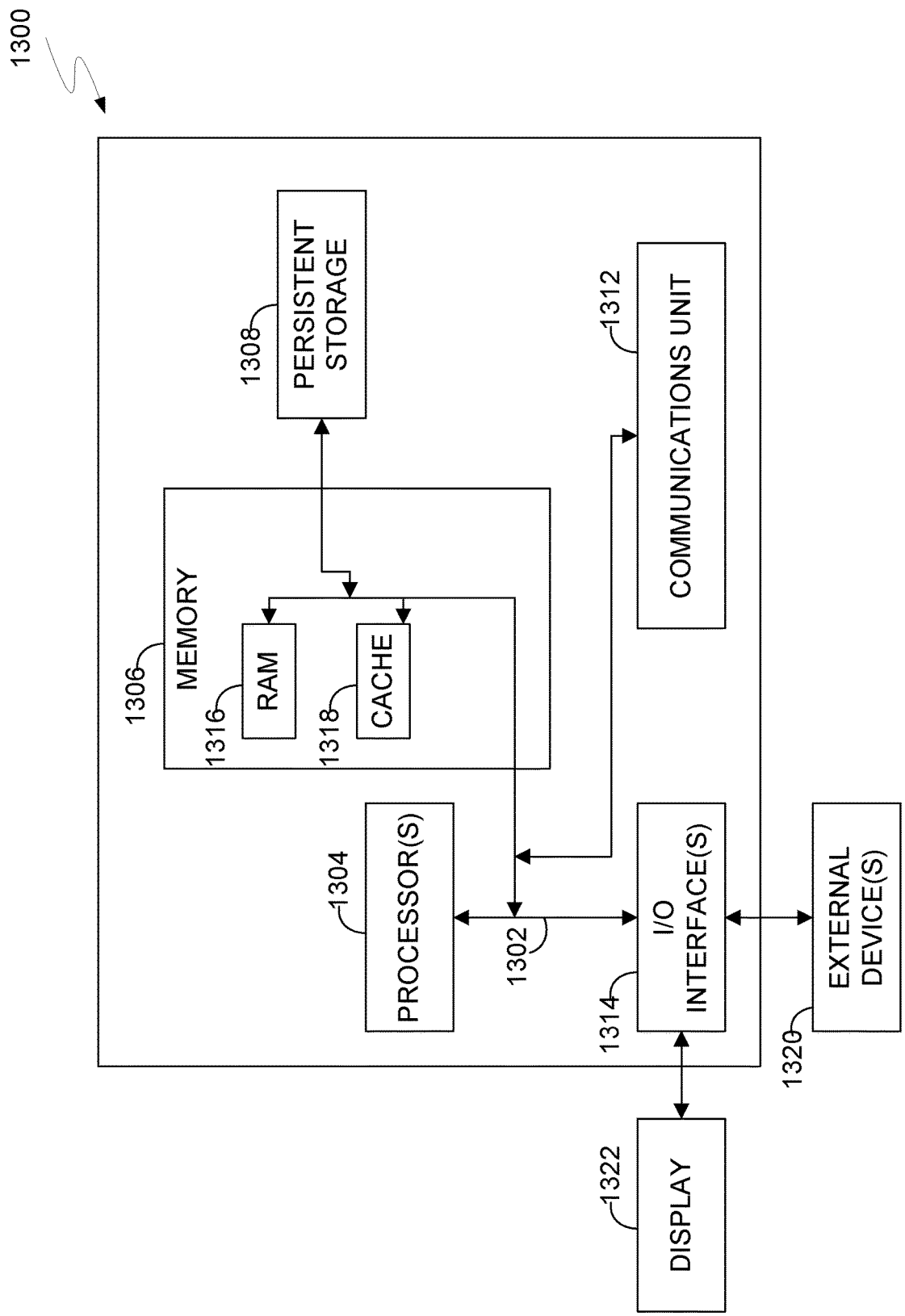
FIG. 13 is a block diagram depicting components of a computer, generally designated 1300, suitable for executing storage management program 201 in accordance with at least one embodiment of the present invention.

FIG. 13 is a block diagram depicting components of a computing device, generally designated 1300, suitable for executing storage management program 201, host device 202, tape library 204, client device 206, storage management system 210, and/or any computing devices generally depicted in FIG. 2 in accordance with at least one embodiment of the present invention. Computing device 1300 includes one or more processor(s) 1304 (including one or more computer processors), communications fabric 1302, memory 1306 including, RAM 1316 and cache 1318, persistent storage 1308, communications unit 1312, I/O interface(s) 1314, display 1322, and external device(s) 1320. It should be appreciated that FIG. 13 provides only an illustration of one embodiment and does not imply any limitations with regard to the environments in which different embodiments may be implemented. Many modifications to the depicted environment may be made.

As depicted, computing device 1300 operates over communications fabric 1302, which provides communications between computer processor(s) 1304, memory 1306, persistent storage 1308, communications unit 1312, and input/output (I/O) interface(s) 1314. Communications fabric 1302 can be implemented with any architecture suitable for passing data or control information between processor(s) 1304 (e.g., microprocessors, communications processors, and network processors), memory 1306, external device(s) 1320, and any other hardware components within a system. For example, communications fabric 1302 can be implemented with one or more buses.

Memory 1306 and persistent storage 1308 are computer readable storage media. In the depicted embodiment, memory 1306 includes random-access memory (RAM) 1316 and cache 1318. In general, memory 1306 can include any suitable volatile or non-volatile one or more computer readable storage media.

Program instructions for storage management program 201 can be stored in persistent storage 1308, or more generally, any computer readable storage media, for execution by one or more of the respective computer processor(s) 1304 via one or more memories of memory 1306. Persistent storage 1308 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 1308 may also be removable. For example, a removable hard drive may be used for persistent storage 1308. Other examples include optical and magnetic disks, thumb drives, and smart cards that are inserted into a drive for transfer onto another computer readable storage medium that is also part of persistent storage 1308.

Communications unit 1312, in these examples, provides for communications with other data processing systems or devices. In these examples, communications unit 1312 can include one or more network interface cards. Communications unit 1312 may provide communications through the use of either or both physical and wireless communications links. In the context of some embodiments of the present invention, the source of the various input data may be physically remote to computing device 1300 such that the input data may be received, and the output similarly transmitted via communications unit 1312.

I/O interface(s) 1314 allows for input and output of data with other devices that may operate in conjunction with computing device 1300. For example, I/O interface(s) 1314 may provide a connection to external device(s) 1320, which may be as a keyboard, keypad, a touch screen, or other suitable input devices. External device(s) 1320 can also include portable computer readable storage media, for example thumb drives, portable optical or magnetic disks, and memory cards. Software and data used to practice embodiments of the present invention can be stored on such portable computer readable storage media and may be loaded onto persistent storage 1308 via I/O interface(s) 1314. I/O interface(s) 1314 also can similarly connect to display 1322. Display 1322 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 14:
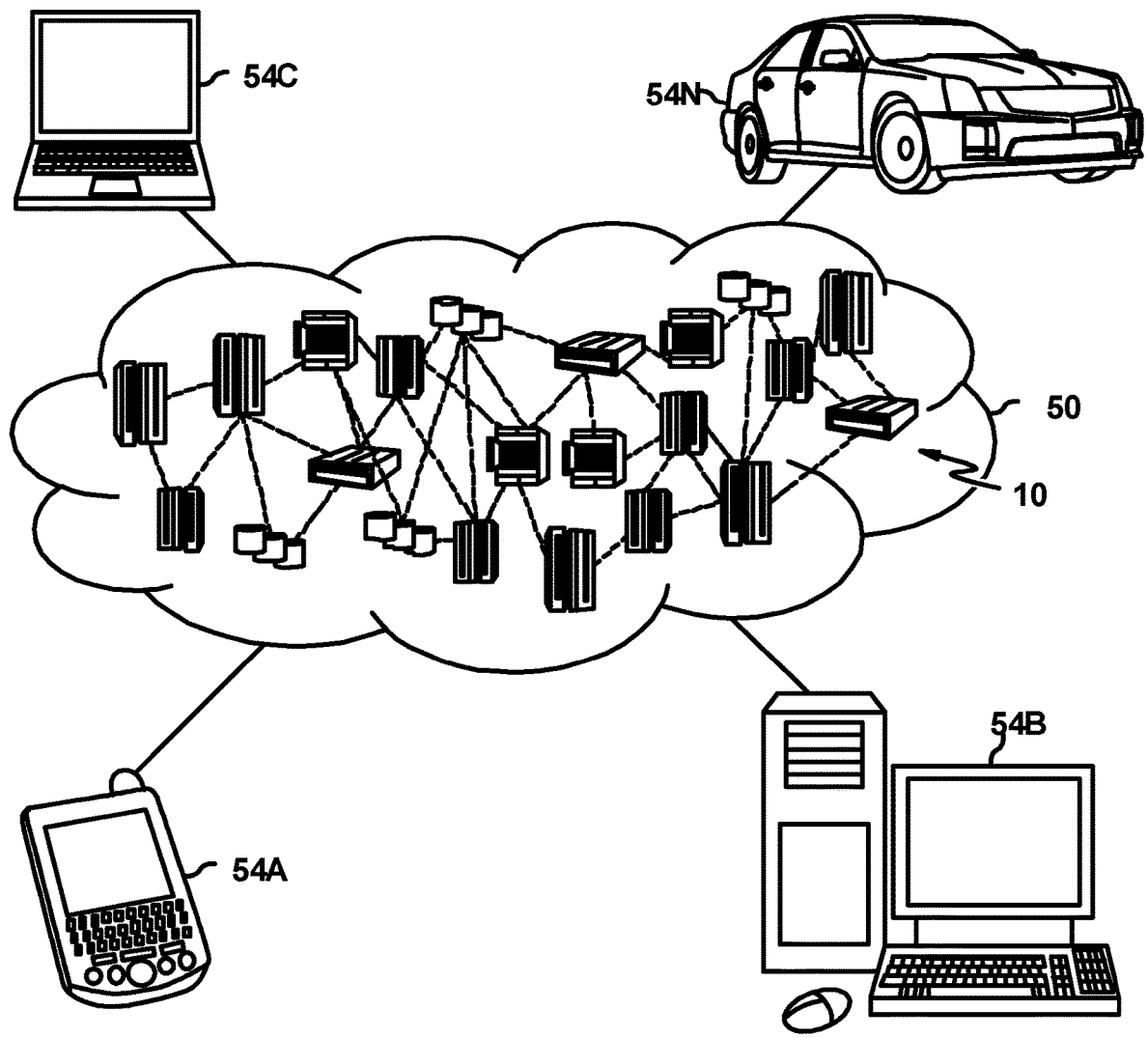
FIG. 14 is a block diagram depicting a cloud computing environment in accordance with at least one embodiment of the present invention.

FIG. 14 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 14 are intended to be illustrative only and that computing nodes 10 and cloud computing environment 50 can communicate with any type of computerized device over any type of network and/or network addressable connection (e.g., using a web browser).

Figure 15:
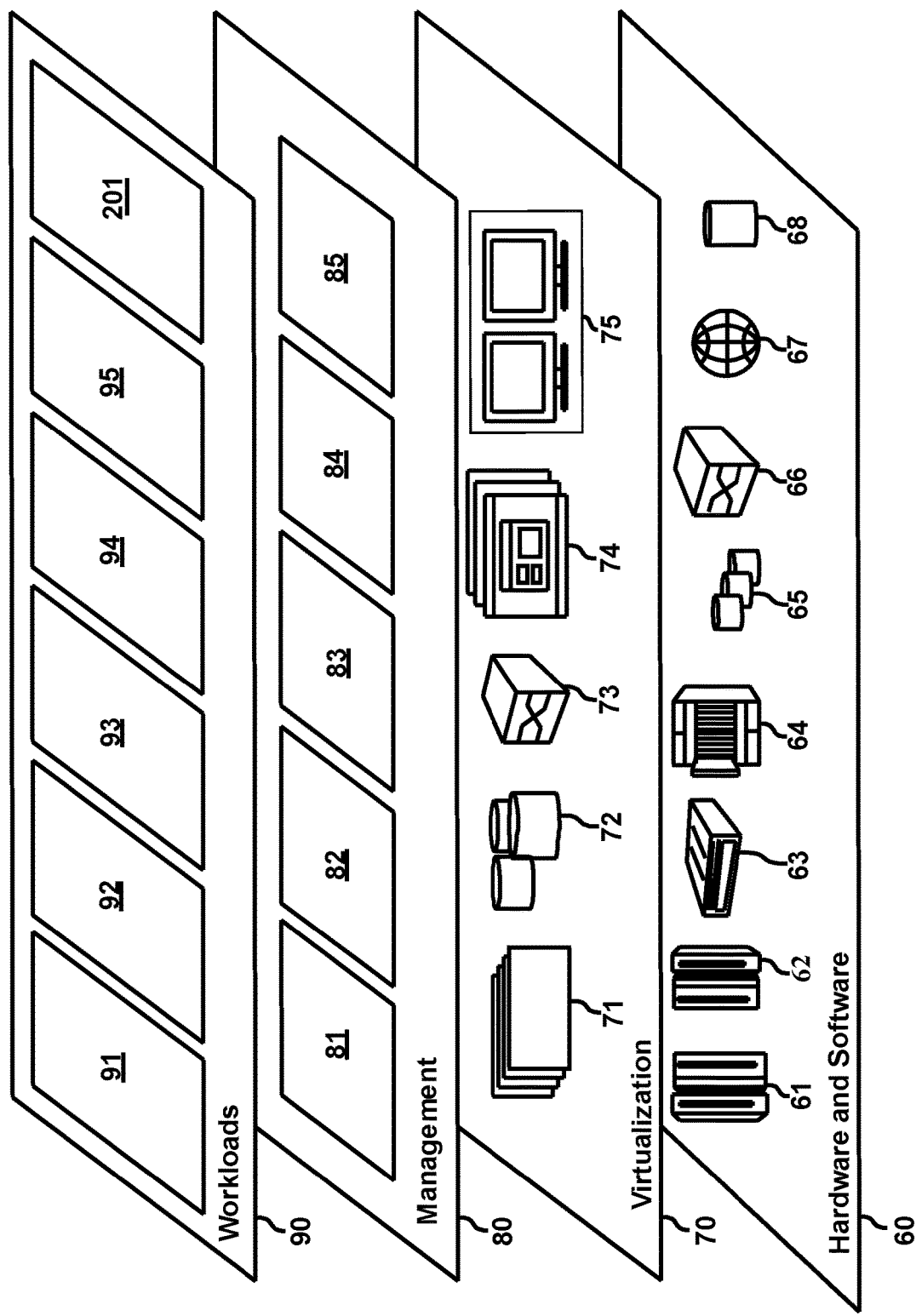
FIG. 15 is block diagram depicting abstraction model layers in accordance with at least one embodiment of the present invention.

FIG. 15 is block diagram depicting a set of functional abstraction model layers provided by cloud computing environment 50 depicted in FIG. 14 in accordance with at least one embodiment of the present invention. It should be understood in advance that the components, layers, and functions shown in FIG. 15 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage management program 201.

What is claimed is:

1. A computer-implemented method for faster unmount of tape drives, the computer-implemented method comprising:
generating, by one or more processors, a batch file to be migrated from a primary storage to a tape media acting as a secondary storage, wherein a size of the batch file is determined based on an amount of available storage space on the tape media between a position in a longitudinal direction of storage (LPOS) and longitudinal position three (LP3) on the tape media; and
migrating, by the one or more processors, the batch file from the primary storage to the tape media mounted on a tape drive, wherein upon completion of migrating the batch file, the LPOS is within a predetermined threshold distance of LP3 on the tape media.

2. The computer-implemented method of claim 1, wherein the LPOS is a file recording end position on the tape media that includes a longitudinal position with respect to a lateral position perpendicular to the longitudinal position.

3. The computer-implemented method of claim 1, wherein upon completion of migrating the batch file, the LPOS is within the predetermined threshold distance of LP3 on a particular Wrap having a longitudinal recording direction from right to left on the tape media.

4. The computer-implemented method of claim 1, wherein upon completion of migrating the batch file, the LPOS is within the predetermined threshold distance of LP3 on a particular Wrap having a longitudinal recording direction from left to right on the tape media.

5. The computer-implemented method of claim 1, wherein a size of a batch file is determined based on an amount of available storage space on the tape media between a LPOS and a next successive LP3 on the tape media.

6. The computer-implemented method of claim 1, wherein a size of a batch file is determined based on an amount of available storage space on the tape media between a LPOS and any subsequent LP3 on the tape media.

7. The computer-implemented method of claim 1, further comprising:
receiving, by one or more processors, a request to recall data stored on a second tape media;
unmounting, by the one or more processors, the tape media from the tape drive upon completion of migrating the batch file; and
mounting, by the one or more processors, the second tape media on the tape drive.

8. The computer-implemented method of claim 7, wherein prior to unmounting the tape media from the tape drive:
moving, by the one or more processors, the tape media to the beginning of the index partition located at LP3; and
overwriting, by the one or more processors, the index with file system meta-data associated with the batch file migrated to the tape media.

9. The computer-implemented method of claim 8, wherein a longitudinal distance required to move the tape media to the beginning of the index partition is within the threshold distance of LPOS from LP3 on the tape media upon completion of migrating the batch file to the tape media.

10. A computer program product for faster unmount of tape drives, the computer program product comprising one or more computer readable storage media and program instructions stored on the one or more computer readable storage media, the program instructions including instructions to:
generate a batch file to be migrated from a primary storage to a tape media acting as a secondary storage, wherein a size of the batch file is determined based on an amount of available storage space on the tape media between a position in a longitudinal direction of storage (LPOS) and longitudinal position three (LP3) on the tape media; and
migrate the batch file from the primary storage to the tape media mounted on a tape drive, wherein upon completion of migrating the batch file, the LPOS is within a predetermined threshold distance of LP3 on the tape media.

11. The computer program product of claim 10, wherein the LPOS is a file recording end position on the tape media that includes a longitudinal position with respect to a lateral position perpendicular to the longitudinal position.

12. The computer program product of claim 10, wherein upon completion of migrating the batch file, the LPOS is within the predetermined threshold distance of LP3 on a particular Wrap having a longitudinal recording direction from right to left on the tape media.

13. The computer program product of claim 10, wherein upon completion of migrating the batch file, the LPOS is within the predetermined threshold distance of LP3 on a particular Wrap having a longitudinal recording direction from left to right on the tape media.

14. The computer program product of claim 10, wherein a size of a batch file is determined based on an amount of available storage space on the tape media between a LPOS and a next successive LP3 on the tape media.

15. The computer program product of claim 10, wherein a size of a batch file is determined based on an amount of available storage space on the tape media between a LPOS and any subsequent LP3 on the tape media.

16. The computer program product of claim 10, further comprising program instructions to:
receive a request to recall data stored on a second tape media;
unmount the tape media from the tape drive upon completion of migrating the batch file; and
mount the second tape media on the tape drive.

17. The computer program product of claim 16, wherein prior to the instructions to unmount the tape media from the tape drive, program instructions to:

move the tape media to the beginning of the index partition located at LP3; and overwrite the index with file system meta-data associated with the batch file migrated to the tape media.

18. The computer program product of claim 17, wherein a longitudinal distance required to move the tape media to the beginning of the index partition is within the predetermined threshold distance of LPOS from LP3 on the tape media upon completion of migrating the batch file to the tape media.

19. A computer system for faster unmount of tape drives, the computer system comprising:

one or more computer processors;

one or more computer readable storage media;

computer program instructions;

the computer program instructions being stored on the one or more computer readable storage media for execution by the one or more computer processors; and the computer program instructions including instructions to:

generate a batch file to be migrated from a primary storage to a tape media acting as a secondary storage, wherein a size of the batch file is determined based on an amount of available storage space on the tape media between a position in a longitudinal direction of storage (LPOS) and longitudinal position three (LP3) on the tape media; and migrate the batch file from the primary storage to the tape media mounted on a tape drive, wherein upon completion of migrating the batch file, the LPOS is within a predetermined threshold distance of LP3 on the tape media.

20. The computer system of claim 19, wherein the LPOS is a file recording end position on the tape media that includes a longitudinal position with respect to a lateral position perpendicular to the longitudinal position.

\* \* \* \* \*